(12) United States Patent
Hatta et al.

(10) Patent No.: US 11,905,848 B2
(45) Date of Patent: Feb. 20, 2024

(54) TURBINE BLADE, MANUFACTURING METHOD FOR TURBINE BLADE, AND GAS TURBINE

(71) Applicant: Mitsubishi Power Ltd., Kanagawa (JP)

(72) Inventors: Masayoshi Hatta, Kanagawa (JP); Keita Takamura, Kanagawa (JP); Susumu Wakazono, Kanagawa (JP); Takashi Fujii, Kanagawa (JP); Hiroyuki Otomo, Kanagawa (JP); Yosuke Mukai, Tokyo (JP); Kazuhisa Tamura, Tokyo (JP); Takaaki Oda, Kanagawa (JP); Hiroshi Kawasaki, Kanagawa (JP); Hiroyuki Kishihara, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 162 days.

(21) Appl. No.: 17/598,013

(22) PCT Filed: Jun. 1, 2020

(86) PCT No.: PCT/JP2020/021536
§ 371 (c)(1),
(2) Date: Sep. 24, 2021

(87) PCT Pub. No.: WO2020/246413
PCT Pub. Date: Dec. 10, 2020

(65) Prior Publication Data
US 2022/0170376 A1     Jun. 2, 2022

(30) Foreign Application Priority Data

Jun. 5, 2019 (JP) .................................. 2019-105440
Dec. 24, 2019 (JP) .................................. 2019-233581

(51) Int. Cl.
*F01D 5/18* (2006.01)
*B23H 9/10* (2006.01)

(52) U.S. Cl.
CPC ............... *F01D 5/187* (2013.01); *B23H 9/10* (2013.01); *F05D 2230/11* (2013.01);
(Continued)

(58) Field of Classification Search
CPC . F01D 5/187; F05D 2230/11; F05D 2250/292
See application file for complete search history.

(56) References Cited

U.S. PATENT DOCUMENTS 5,482,435 A    1/1996  Dorris et al.
8,506,251 B2 *  8/2013  Hada ........................ F01D 5/18
                                            416/92

(Continued)

FOREIGN PATENT DOCUMENTS

EP    0207799 A2 *  1/1987
JP    56-69423        6/1981

(Continued)

OTHER PUBLICATIONS

Sharma, Electrochemical Drilling of Inconel Superalloy with Acidified Sodium Chloride Electrolyte, 2002, The International Journal of Advanced Manufacturing Technology (Year: 2002).*

(Continued)

*Primary Examiner* — Eldon T Brockman
(74) *Attorney, Agent, or Firm* — Wenderoth, Lind & Ponack, L.L.P.

(57) ABSTRACT

To provide a turbine blade, a manufacturing method for a turbine blade, and a gas turbine. In the turbine blade including a cooling passage provided along a blade height direction, the cooling passage includes: a first cooling hole including one end opening toward a front end, and having an inner diameter that is constant along the blade height direc- (Continued)

tion; and a second cooling hole including one end communicating with the other end of the first cooling hole without a level difference, and having an inner diameter that is increased toward a base end. A length from the one end of the first cooling hole to a position where the first cooling hole and the second cooling hole are communicated with is 40% to 60% of a length from the one end of the first cooling hole to a gas path surface on the base end.

12 Claims, 14 Drawing Sheets

(52) U.S. Cl.
CPC .... *F05D 2240/81* (2013.01); *F05D 2250/292* (2013.01); *F05D 2260/2214* (2013.01)

(56) References Cited

U.S. PATENT DOCUMENTS

| | | | | |
|---|---|---|---|---|
| 8,511,992 | B2* | 8/2013 | Dahmer | F01D 5/187 29/889.22 |
| 8,827,646 | B2* | 9/2014 | Hada | B23H 9/10 416/92 |
| 2001/0048878 | A1 | 12/2001 | Willett et al. | |
| 2011/0217180 | A1 | 9/2011 | Hada et al. | |
| 2011/0217181 | A1* | 9/2011 | Hada | F01D 5/187 29/889.721 |
| 2012/0243914 | A1 | 9/2012 | Yoshii et al. | |
| 2014/0161625 | A1* | 6/2014 | Zhang | F01D 5/187 416/96 R |
| 2014/0286771 | A1 | 9/2014 | Lacy | |
| 2017/0274451 | A1 | 9/2017 | Hatherley et al. | |

FOREIGN PATENT DOCUMENTS

| | | |
|---|---|---|
| JP | 3-182602 | 8/1991 |
| JP | 2000-297604 | 10/2000 |
| JP | 2006-266112 | 10/2006 |
| JP | 2009-167934 | 7/2009 |
| JP | 2012-203100 | 10/2012 |
| JP | 5200189 | 2/2013 |
| JP | 2014-114816 | 6/2014 |
| WO | 2011/108164 | 9/2011 |
| WO | 2011/108440 | 9/2011 |

OTHER PUBLICATIONS

Ali, Shaped tube electrochemical drilling of good quality holes, 2009, CIRP Annals—Manufacturing Technology (Year: 2009).*
Office Action dated Feb. 4, 2023 in corresponding Chinese Patent Application No. 202080026105.8, with English language translation.
International Search Report dated Aug. 11, 2020, issued in International (PCT) Application No. PCT/JP2020/021536.
Written Opinion dated Aug. 11, 2020, in International (PCT) Application No. PCT/JP2020/021536, with Englosh-language Translation.
Office Action dated Nov. 17, 2023 in corresponding German Patent Application No. 112020001010.4, with English translation, 22 pages.

* cited by examiner

TURBINE BLADE, MANUFACTURING METHOD FOR TURBINE BLADE, AND GAS TURBINE

FIELD

The present disclosure relates to a turbine blade such as a rotor blade and a stator vane applied to a gas turbine, a manufacturing method for a turbine blade, and a gas turbine including the turbine blade.

BACKGROUND

A gas turbine includes a compressor, a combustor, and a turbine. The compressor compresses air taken in from an air intake to be compressed air having high temperature and high pressure. The combustor supplies fuel to the compressed air to combust the mixture, and generates a combustion gas having high temperature and high pressure. The turbine is driven by the combustion gas, and drives a power generator that is coaxially coupled thereto.

It is known that a cooling passage is provided inside a turbine blade such as a rotor blade and a stator vane of a gas turbine, and a cooling fluid is caused to flow through the cooling passage to cool the turbine blade that is subjected to a gas flow of high temperature. For example, the following Patent Literature 1 discloses an article in which a plurality of cooling holes through which a cooling medium flows are provided to a blade part along the longitudinal direction, the cooling holes passing through the blade part, and the cooling holes include a large-diameter part, an intermediate-diameter part, and a small-diameter part having different diameters to sufficiently cool the blade up to a front end portion of the blade. The following Patent Literature 2 discloses an article in which a plurality of cooling passages through which cooling air flows are provided to a blade part along the longitudinal direction, the cooling passages passing through the blade part, and the diameters of the cooling passages are changed in a front and rear direction of the blade part.

CITATION LIST

Patent Literature

Patent Literature 1: Japanese Patent Application Laid-open No. 2009-167934
Patent Literature 2: Japanese Patent Application Laid-open No. 2012-203100

SUMMARY

Technical Problem

In the conventional turbine blade described above, the large-diameter part, the intermediate-diameter part, and the small-diameter part having different diameters are disposed by disposing a flow channel change part at at least one point in the longitudinal direction of the cooling hole. However, there is the problem that, when the flow channel change part the diameter of which is changed is disposed at a predetermined position in the longitudinal direction of the cooling hole, stress concentration is caused in the flow channel change part, which may cause damage of the turbine blade.

An object of the present disclosure is to solve the problem described above, to provide a turbine blade for improving cooling performance by efficiently cooling the blade, and to provide a gas turbine and a manufacturing method for a turbine blade by which the turbine blade can be efficiently manufactured.

Solution to Problem

In order to achieve the above object, a turbine blade according to the present disclosure includes a cooling passage provided along a blade height direction. The cooling passage includes a first cooling hole that includes one end opening toward a front end, and has an inner diameter that is constant along the blade height direction; and a second cooling hole that includes one end communicating with another end of the first cooling hole without a level difference, and has an inner diameter that is increased toward a base end. A length from the one end of the first cooling hole to a position where the first cooling hole and the second cooling hole are communicated with is 40% to 60% of a length from the one end of the first cooling hole to a gas path surface on the base end.

Further, a turbine blade according to the present disclosure includes a plurality of cooling passages provided along a blade height direction that are disposed at intervals in a front and rear direction of the blade. The cooling passage includes a first cooling passage that includes a cooling hole having an inner diameter that is increased by a first expansion ratio from a front end toward a base end; and a second cooling passage that includes a cooling hole having an inner diameter that is constant or increased by a second expansion ratio smaller than the first expansion ratio from the front end toward the base end.

A manufacturing method for a turbine blade according to the present disclosure includes the steps of: forming a first cooling hole by electrolytic machining, the first cooling hole having an inner diameter that is constant along a blade height direction from a front end toward a base end of the turbine blade; and forming a second cooling hole by electrolytic machining while changing at least one of a current value and a machining speed so that the second cooling hole communicates with the first cooling hole without a level difference, the second cooling hole having an inner diameter that is increased along the blade height direction. A length from one end of the first cooling hole on a front end of the turbine blade to a position where the first cooling hole and the second cooling hole are communicated with is 40% to 60% of a length from one end of the first cooling hole to a gas path surface on the base end of the turbine blade.

Further, a manufacturing method according to the present disclosure is for a turbine blade including a plurality of cooling passages along a blade height direction that are disposed at intervals in a front and rear direction of a blade. The manufacturing method includes the steps of: forming a first cooling passage by electrolytic machining while adjusting at least one of a current value and a machining speed from a front end toward a base end of the turbine blade, the first cooling passage having an inner diameter that is increased along the blade height direction by a first expansion ratio; and forming a second cooling passage by electrolytic machining while adjusting at least one of a current value and a machining speed from the front end toward the base end of the turbine blade, the second cooling passage having an inner diameter that is constant or increased by a second expansion ratio smaller than the first expansion ratio along the blade height direction.

A gas turbine according to the present disclosure includes a compressor configured to compress air; a combustor configured to mix compressed air compressed by the compressor with fuel and combust a resulting mixture; and a turbine configured to obtain rotation power using a combustion gas generated by the combustor. The turbine includes the above-mentioned turbine blade.

Advantageous Effects of Invention

With the turbine blade, the manufacturing method for a turbine blade, and the gas turbine according to the present disclosure, cooling performance can be improved by efficiently cooling the blade, and the turbine blade can be efficiently manufactured.

DESCRIPTION OF EMBODIMENTS

The following describes preferred embodiments of the present disclosure in detail with reference to the drawings. The present disclosure is not limited to the embodiments. In a case in which there are a plurality of embodiments, the embodiments may be combined with each other. Constituent elements in the embodiments encompass a constituent element easily conceivable by those skilled in the art, substantially the same constituent element, and what is called an equivalent.

First Embodiment

Gas Turbine

Figure 1:
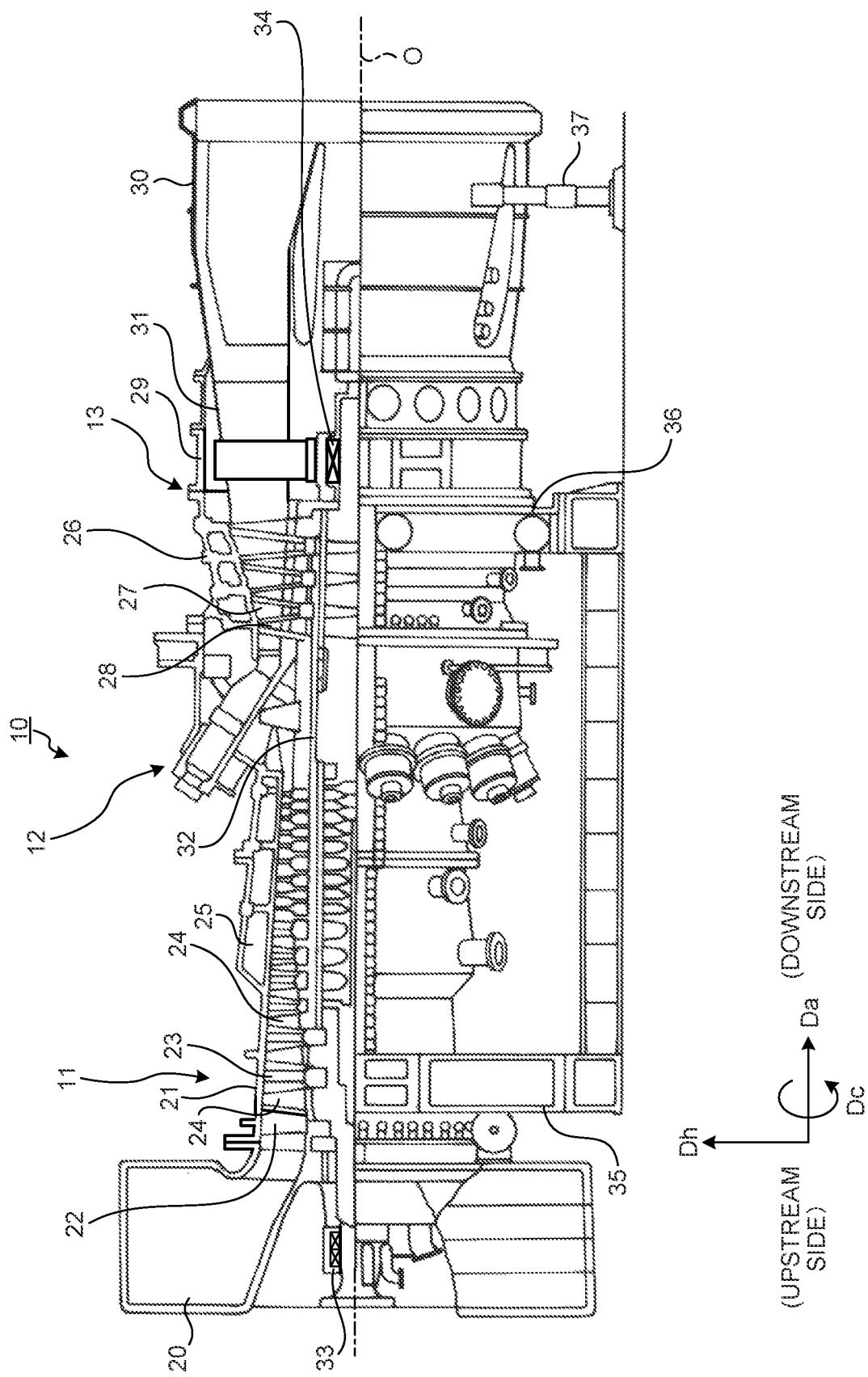
FIG. 1 is a schematic diagram illustrating the entire configuration of a gas turbine according to a first embodiment.

FIG. 1 is a schematic diagram illustrating the entire configuration of a gas turbine according to a first embodiment. In the following description, assuming that a center axis of a rotor of the gas turbine is O, a direction in which the axis O extends is assumed to be an axial direction Da, a radial direction of the rotor orthogonal to the axis O of the rotor is assumed to be a blade height direction Dh, and a circumferential direction centered on the axis O of the rotor is assumed to be a circumferential direction Dc.

In the first embodiment, as illustrated in FIG. 1, a gas turbine 10 includes a compressor 11, a combustor 12, and a turbine 13. The gas turbine 10 is coaxially coupled to a power generator (not illustrated), and can generate electric power by the power generator.

The compressor 11 includes an air intake 20 for taking in air. An inlet guide vane (IGV) 22 is disposed inside a compressor casing chamber 21, a plurality of stator vanes 23 and rotor blades 24 are alternately disposed in the axial direction Da, and an air bleed chamber 25 is disposed outside. The combustor 12 can supply fuel to the compressed air that is compressed by the compressor 11 and ignite, thereby combusting the mixture. In the turbine 13, a plurality of stator vanes 27 and rotor blades 28 are alternately disposed in the axial direction Da inside a turbine casing chamber 26. In the turbine casing chamber 26, an exhaust chamber 30 is provided in a downstream side via an exhaust casing chamber 29, and the exhaust chamber 30 includes an exhaust diffuser 31 continuing to the turbine 13.

A rotor 32 is positioned to pass through center parts of the compressor 11, the combustor 12, the turbine 13, and the exhaust chamber 30. An end part on the compressor 11 side of the rotor 32 is supported by a bearing 33 in a rotatable manner, and an end part on the exhaust chamber 30 side thereof is supported by a bearing 34 in a rotatable manner. The rotor 32 is fixed by stacking a plurality of disks on which the respective rotor blades 24 are mounted in the compressor 11, and fixed by stacking a plurality of disks on which the respective rotor blades 28 are mounted in the turbine 13. A drive shaft of the power generator (not illustrated) is coupled to an end part on the exhaust chamber 30 side of the rotor 32.

In the gas turbine 10, the compressor casing chamber 21 of the compressor 11 is supported by a leg part 35, the turbine casing chamber 26 of the turbine 13 is supported by a leg part 36, and the exhaust chamber 30 is supported by a leg part 37.

Thus, air that is taken in from the air intake 20 of the compressor 11 passes through the inlet guide vane 22, the stator vanes 23, and the rotor blades 24, and is compressed to be compressed air having high temperature and high pressure. The combustor 12 supplies a predetermined fuel to the compressed air, and combusts the mixture. A combustion gas having high temperature and high pressure as a working fluid generated by the combustor 12 passes through the stator vanes 27 and the rotor blades 28 constituting the turbine 13 to drive and rotate the rotor 32, and drives the power generator coupled to the rotor 32. On the other hand, the combustion gas that has drove the turbine 13 is released into the atmosphere as a flue gas.

Turbine Blade

Figure 2:
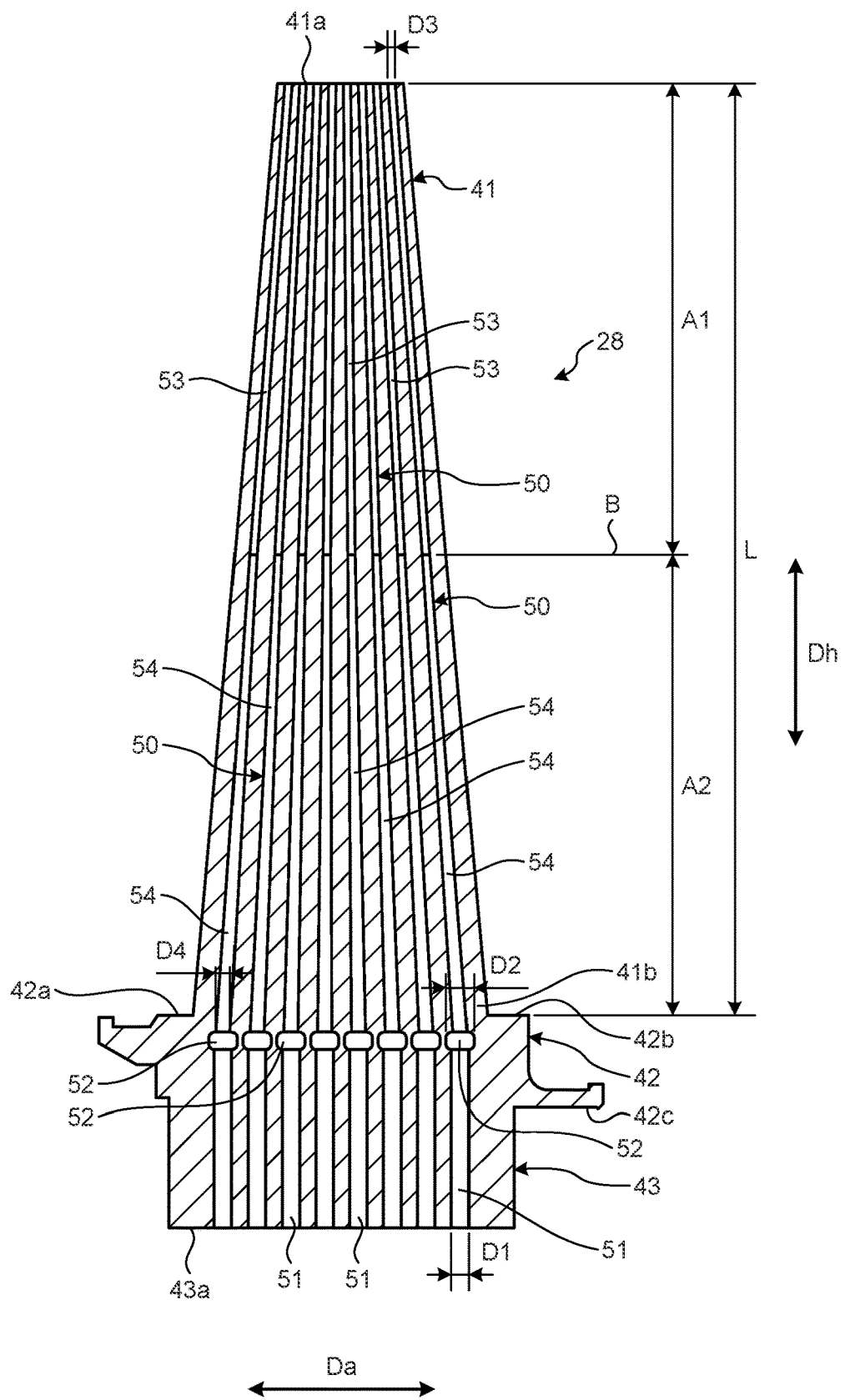
FIG. 2 is a vertical cross-sectional view illustrating a rotor blade as a turbine blade according to the first embodiment.

The following describes the rotor blade 28 as the turbine blade according to the first embodiment in detail. FIG. 2 is a vertical cross-sectional view illustrating the rotor blade as the turbine blade according to the first embodiment.

As illustrated in FIG. 2, the rotor blade 28 includes a blade part 41, a platform 42, and a blade root part 43. The blade part 41 has a long shape along a blade height direction Dh, and a front end 41a has a tapering shape with respect to a base end 41b. In the platform 42, surfaces 42a and 42b are gas path surfaces, and the base end 41b of the blade part 41 is integrally connected to the surfaces 42a and 42b. The blade root part 43 has what is called a Christmas tree shape when viewed from the axial direction Da, and is integrally connected to a back surface 42c of the platform 42. The blade root part 43 is fixed to an outer peripheral part of the rotor 32 (refer to FIG. 1).

In the rotor blade 28, a plurality of cooling passages 50 are provided along the blade height direction Dh. The cooling passage 50 includes a base end-side cooling hole 51, a cavity part 52, a first cooling hole 53, and a second cooling hole 54.

One end of the base end-side cooling hole 51 opens toward a base end of the rotor blade 28, that is, a base end 43a of the blade root part 43. The base end-side cooling hole 51 is provided along the blade height direction Dh, and has an inner diameter D1 that is constant along the blade height direction Dh. The cavity part 52 is provided in the platform 42 (or the blade root part 43). The cavity part 52 communicates with the other end part of the base end-side cooling hole 51. An inner diameter D2 of the cavity part 52 is larger than the inner diameter D1 of the base end-side cooling hole 51.

One end of the first cooling hole 53 opens toward the front end of the rotor blade 28, that is, the base end 41b of the blade part 41. The first cooling hole 53 is provided along the blade height direction Dh, and has an inner diameter D3 that is constant along the blade height direction Dh. One end of the second cooling hole 54 communicates with the other end of the first cooling hole 53, and the other end thereof communicates with the cavity part 52. An inner diameter D4 of the second cooling hole 54 is gradually increased from one end toward the other end. In this case, the second cooling hole 54 has a tapered shape such that the inner diameter is continuously increased from one end toward the base end.

The inner diameter D2 of the cavity part 52 is larger than the inner diameter D1 of the base end-side cooling hole 51, the inner diameter D1 of the base end-side cooling hole 51 is larger than a maximum inner diameter D4 of the second cooling hole 54, and a minimum inner diameter D3 of the second cooling hole 54 is the same as the inner diameter D4 of the first cooling hole 53. The inner diameter D4 of the second cooling hole 54 is gradually increased from one end toward the other end, and an inner diameter expansion ratio of the second cooling hole 54 is equal to or larger than 100% and smaller than 200%. The inner diameter expansion ratio of the second cooling hole 54 is preferably equal to or larger than 100% and smaller than 175%. Herein, the inner diameter expansion ratio is an expansion ratio of the inner diameter at the other end with respect to the inner diameter at one end of the second cooling hole 54.

The first cooling hole 53 is formed in a region A1 on the front end 41a of the blade part 41, and the second cooling hole 54 is formed in a region A2 on the base end 41b of the blade part 41. Assuming that a length along the blade height direction Dh obtained by combining the first cooling hole 53 with the second cooling hole 54 is L(A1+A2), a length from one end of the first cooling hole (the front end 41a of the blade part 41) to a position B where the first cooling hole 53 and the second cooling hole 54 are communicated with is 40% to 60% of a length from one end of the first cooling hole 53 to the gas path surface on the base end. That is, the length from one end of the first cooling hole to the position B where the first cooling hole 53 and the second cooling hole 54 are communicated with is 40% to 60% of a length L from the front end 41a to the surface 42b on a trailing edge along the blade height direction Dh.

Herein, the front end 41a of the blade part 41 is a position of an end face on the front end along the blade height direction Dh. In a structure in which a chip shroud is disposed at the front end 41a of the blade part 41, the front end 41a of the blade part 41 is a position of the gas path surface on the chip shroud. The base end 41b of the blade part 41 is a position of an end face on the base end along the blade height direction Dh, and positions of the surfaces 42a and 42b as the gas path surfaces of the platform 42. In a case of defining the length along the blade height direction Dh of the blade part 41, the length is a length on a side of the front end 41a and a surface 43b as a position on the trailing edge (right side in FIG. 2) of the blade part 41.

Cooling air is supplied to a base end part of the rotor blade 28, and passes through the base end-side cooling hole 51, the cavity part 52, the second cooling hole 54, and the first cooling hole 53 to be discharged to the outside. At this time, the rotor blade 28 is cooled by the cooling air passing through the base end-side cooling hole 51, the cavity part 52, the second cooling hole 54, and the first cooling hole 53. At this time, first, the cooling air flows through the base end-side cooling hole 51 and the cavity part 52 to cool the platform 42 and the blade root part 43, and flows through the second cooling hole 54 and the first cooling hole 53 next to cool the blade part 41.

Typically, creep strength of the rotor blade 28 is the most severe in the vicinity of the middle in the blade height direction Dh of the blade part 41. However, the cooling air flows through the base end-side cooling hole 51, the cavity part 52, the second cooling hole 54, and the first cooling hole 53 in this order to cool the rotor blade 28, so that the cooling air the temperature of which is raised by cooling the platform 42 and the blade root part 43 cools the blade part 41. Accordingly, it becomes difficult to efficiently cool a middle position in the blade height direction Dh of the blade part 41 having a high heat load.

Thus, in the first embodiment, the inner diameter D4 of the second cooling hole 54 disposed at a position close to the platform 42 is increased, while the inner diameter D3 of the first cooling hole 53 disposed at the middle position in the blade height direction Dh of the blade part 41 is reduced. To cause the first cooling hole 53 to communicate with the second cooling hole 54 without a level difference, the inner diameter D4 of the second cooling hole 54 is continuously changed between the first cooling hole 53 and the cavity part 52.

The cooling air supplied to the base end part of the rotor blade 28 is introduced into the cavity part 52 through the base end-side cooling hole 51, and flows from the cavity part 52 to the second cooling hole 54 and the first cooling hole 53 to be discharged to the outside. At this point, the inner diameters of the base end-side cooling hole 51 and the cavity part 52 are larger than those of the second cooling hole 54 and the first cooling hole 53, so that a flow velocity of the cooling air is low. On the other hand, the inner diameter of the second cooling hole 54 is gradually reduced toward the first cooling hole 53, so that the flow velocity of the cooling air is gradually increased, and the cooling air flows into the first cooling hole 53 at the highest flow velocity. Thus, the flow velocity of the cooling air flowing from a communicating part of the second cooling hole 54 and the first cooling hole 53 to the first cooling hole 53 becomes the maximum, and the cooling air having a lower temperature is supplied from the second cooling hole 54 to the first cooling hole 53. Accordingly, a part from the middle position having a high heat load to the front end of the blade part 41 can be efficiently cooled.

Manufacturing Method for Turbine Blade

Figure 3:
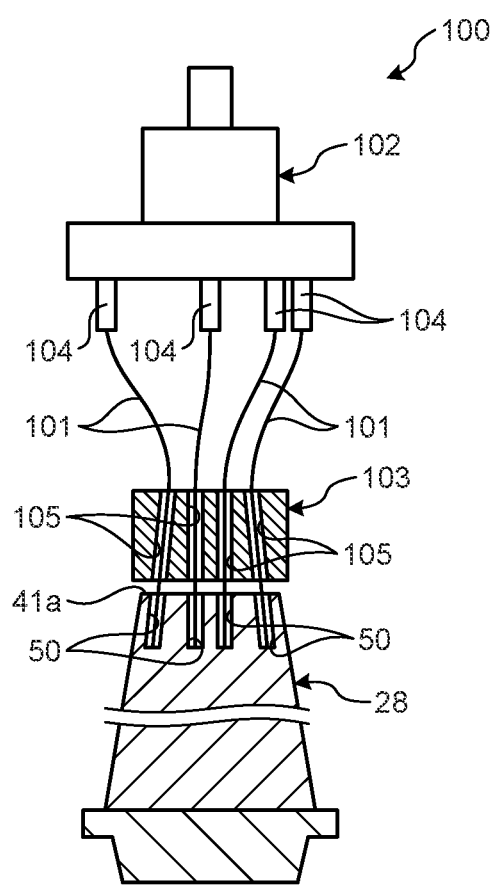
FIG. 3 is a schematic diagram illustrating an electrolytic machining device.
Figure 4:
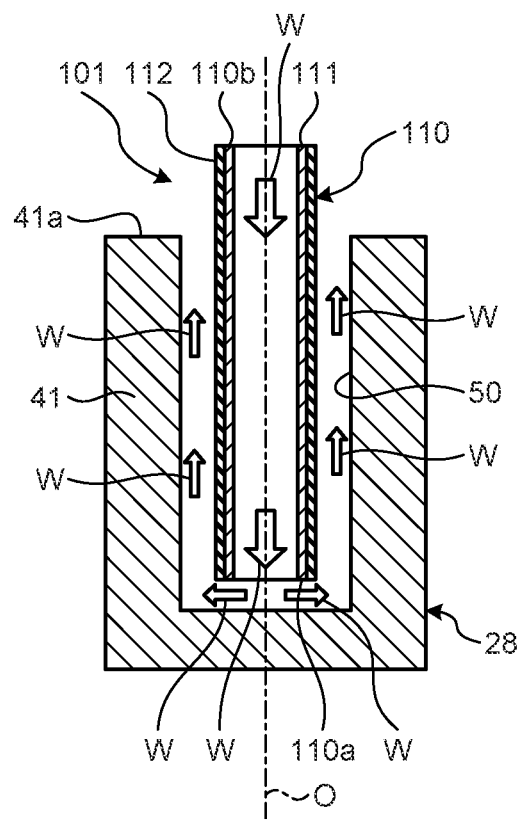
FIG. 4 is a cross-sectional view for explaining a manufacturing method for a turbine blade according to the first embodiment.

The following describes a manufacturing method for the rotor blade 28 according to the first embodiment, specifically, a method of forming the cooling passage 50 in the rotor blade 28. FIG. 3 is a schematic diagram illustrating an electrolytic machining device, and FIG. 4 is a cross-sectional view for explaining the manufacturing method for a turbine blade according to the first embodiment.

As illustrated in FIG. 3, an electrolytic machining device 100 includes a plurality of electrolytic machining tools 101 for forming the cooling passages 50 in the rotor blade 28, a moving mechanism 102 for advancing the electrolytic machining tool 101, and a guiding part 103 for guiding the electrolytic machining tool 101 at the time of advancing the electrolytic machining tool 101.

The moving mechanism 102 advances and retreats the electrolytic machining tool 101 with respect to the rotor blade 28. The moving mechanism 102 is disposed on the front end 41a of the blade part 41 in the rotor blade 28, and is configured to be able to advance or retreat with respect to the front end 41a. The moving mechanism 102 uses, for example, a drive device (not illustrated) to advance or retreat the electrolytic machining tool 101.

The moving mechanism 102 includes a plurality of grasping parts 104 for grasping a base end 110b (refer to FIG. 4) of the electrolytic machining tool 101 on a surface on the front end 41a of the rotor blade 28. The grasping part 104 has a cylindrical shape the inner part of which is hollow, and can grasp the electrolytic machining tool 3101 when the base end 110b of the electrolytic machining tool 101 is inserted to one end in the axial direction. The other end of the grasping part 104 is connected to an electrolytic solution flow passage (not illustrated), and an electrolytic solution W (refer to FIG. 4) is supplied to the inside of the grasping part 104 via the electrolytic solution flow passage. A supply amount of the electrolytic solution W can be optionally adjusted by a flow rate control device (not illustrated). As the electrolytic solution W, for example, sulfuric acid, nitric acid, a saline solution, and the like are used.

The guiding part 103 is disposed between the moving mechanism 102 and the front end 41a of the rotor blade 28, and guides the electrolytic machining tool 101 that is advanced or retreated by the moving mechanism 102 to move in a predetermined advancing direction with respect to the front end 41a of the rotor blade 28. In the guiding part 103, a plurality of guide holes 105 for causing the moving mechanism 102 side to communicate with the rotor blade 28 side are formed. The electrolytic machining tool 101 is inserted into each of the guide holes 105 from the moving mechanism 102 toward the rotor blade 28. When the electrolytic machining tool 101 is advanced by the moving mechanism 102 in this state, the electrolytic machining tool 101 can be introduced at a desired position at the front end 41a of the rotor blade 28, and at a desired angle with respect to the front end 41a depending on arrangement of the guide hole 105.

The following describes the electrolytic machining tool 101. The electrolytic machining tool 101 forms the cooling passage 50 in the rotor blade 28 by electrolytic machining. As illustrated in FIG. 4, the electrolytic machining tool 101 includes a tool main body 110 including an electrode 111 and an insulating layer 112 that covers the electrode 111 from an outer circumference, and having a cylindrical shape as a whole.

The electrode 111 of the tool main body 110 has a cylindrical shape extending along the axis O, and is constituted of a conductive material having flexibility such as stainless steel, copper, or titanium, for example. A hollow portion inside the electrode 111 (inner part of the electrode 111) communicates with a hollow portion of the grasping part 104 of the moving mechanism 102 (refer to FIG. 3). Due to this, the electrolytic solution W used for electrolytic machining is caused to flow through the electrode 111 from the base end 110b (the moving mechanism 102 side) of the tool main body 110 toward a front end 110a (the rotor blade 28).

An end face of the electrode 111 on the front end 110a has a flat shape orthogonal to the axis O, or a tapered shape. The electrode 111 has a cylindrical shape in the first embodiment, but may have an angular cylindrical shape having a polygonal cross section, for example.

The insulating layer 112 of the tool main body 110 is, for example, constituted of a polyester-based resin and the like having an electrical insulation property, coated on an outer peripheral surface of the electrode 111, and an end face of the electrode 111 on the front end 110a is not covered by the insulating layer 112, so that the electrode 111 is exposed.

In the electrolytic machining device 100 as described above, the electrolytic solution W that is caused to flow through the inside of the electrode 111 by the electrolytic machining tool 101 is led out from the front end 110a of the tool main body 110. Energization is then caused between the end face of the front end 110a of the tool main body 110 and an inner surface of the cooling passage 50 of the rotor blade 28 via the led-out electrolytic solution W, the rotor blade 28 is electrolyzed, and the cooling passage 50 is machined more deeply toward the axis O direction.

As illustrated in FIG. 2, in the rotor blade 28 according to the first embodiment, the cooling passage 50 includes the base end-side cooling hole 51, the cavity part 52, the first cooling hole 53, and the second cooling hole 54, and the inner diameter D4 of the second cooling hole 54 is gradually increased from one end toward the other end.

Figure 5:
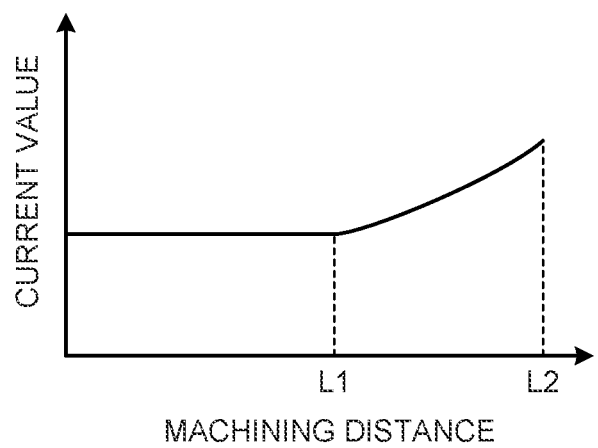
FIG. 5 is a graph representing a current value with respect to a machining distance at the time of one-pass machining of a cooling hole.
Figure 6:
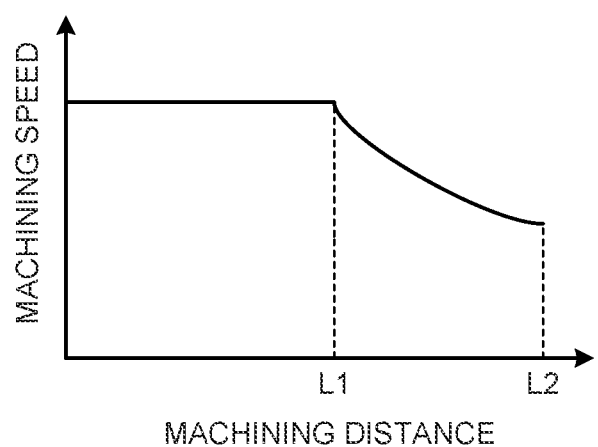
FIG. 6 is a graph representing a machining speed with respect to the machining distance at the time of one-pass machining of the cooling hole.

The manufacturing method for a turbine blade according to the first embodiment is used for forming the base end-side cooling hole 51, the cavity part 52, the first cooling hole 53, and the second cooling hole 54 constituting the cooling passage 50. FIG. 5 is a graph representing a current value with respect to a machining distance at the time of one-pass machining of the cooling hole, and FIG. 6 is a graph representing a machining speed with respect to the machining distance at the time of one-pass machining of the cooling hole.

The manufacturing method for a turbine blade according to the first embodiment is used for forming the cooling passage 50 along the blade height direction Dh by electrolytic machining from the front end toward the base end of the rotor blade 28, and includes a step of forming the first cooling hole 53 having an inner diameter that is constant along the blade height direction by electrolytic machining while keeping a current value and machining speed constant from the front end, and a step of forming the second cooling hole 54 the inner diameter of which is increased along the blade height direction Dh by electrolytic machining while changing at least one of the current value and the machining speed from the first cooling hole 53.

The manufacturing method for a turbine blade according to the first embodiment includes a step of forming the base end-side cooling hole 51 having the inner diameter that is constant along the blade height direction Dh by electrolytic machining while keeping the current value and the machining speed constant from the base end, and a step of forming the cavity part 52 the inner diameter of which is larger than the inner diameter of the base end-side cooling hole 51 by electrolytic machining while reducing the machining speed to a minimum machining speed set in advance at an end part of the base end-side cooling hole 51 so that the second cooling hole 54 communicates with the cavity part 52.

That is, first, the electrolytic machining tool 101 is moved from the base end to the front end of the rotor blade 28 using the electrolytic machining device 100 described above while keeping the current value and the machining speed constant to form, by electrolytic machining, the base end-side cooling hole 51 the inner diameter of which is unchanged and constant. Next, while keeping the current value and the machining speed constant, the machining speed of the electrolytic machining tool 101 is reduced, or the electrolytic machining tool 101 is stopped to form the cavity part 52 the inner diameter of which is larger than the inner diameter of the base end-side cooling hole 51 by electrolytic machining.

Subsequently, by moving the electrolytic machining tool 101 from the front end to the base end of the rotor blade 28 while keeping the current value and the machining speed constant, the first cooling hole 53 the inner diameter of which is unchanged and constant is formed by electrolytic machining. Finally, by moving the electrolytic machining tool 101 from the end part of the first cooling hole 53 formed in the rotor blade 28 to the base end of the rotor blade 28 while changing at least one of the current value and the machining speed, the second cooling hole 54 the inner diameter of which is gradually increased is formed by electrolytic machining. Thus, the first cooling hole 53 and the taper-shaped second cooling hole 54 can be formed in the blade part 41 of the rotor blade 28 without a level difference at the communicating part.

Specifically, as illustrated in FIG. 5, up to a machining distance L1 corresponding to the region A1, the electrolytic machining tool 101 is moved while keeping the current value and the machining speed constant to form the first cooling hole 53 the inner diameter of which is constant. Thereafter, up to a machining distance L2 corresponding to a region A1+A2, the electrolytic machining tool 101 is moved while increasing the current value to form the second cooling hole 54 the inner diameter of which is gradually increased. Alternatively, as illustrated in FIG. 6, after forming the first cooling hole 53, up to the machining distance L2 corresponding to the region A1+A2, the electrolytic machining tool 101 is moved while reducing the machining speed to form the second cooling hole 54 the inner diameter of which is gradually increased. At this point, a change rate for changing the current value or the machining speed may be appropriately set depending on the shape of the second cooling hole 54. At the time of moving the electrolytic machining tool 101 to form the second cooling hole 54, an electrolytic machining amount is gradually increased, so that a hydrogen gas generated during machining may be increased, and discharging performance of sludge may be deteriorated. Thus, it is preferable to gradually increase the flow velocity of the electrolytic solution W.

At the step of forming the second cooling hole 54 by electrolytic machining, it is preferable to form the second cooling hole 54 the inner diameter of which is gradually increased by electrolytic machining by moving the electrolytic machining tool 101 while keeping the current value constant at the maximum and changing the machining speed. By keeping the current value constant at the maximum, a large machining amount can be secured, and a machining time can be shortened.

Figure 7:
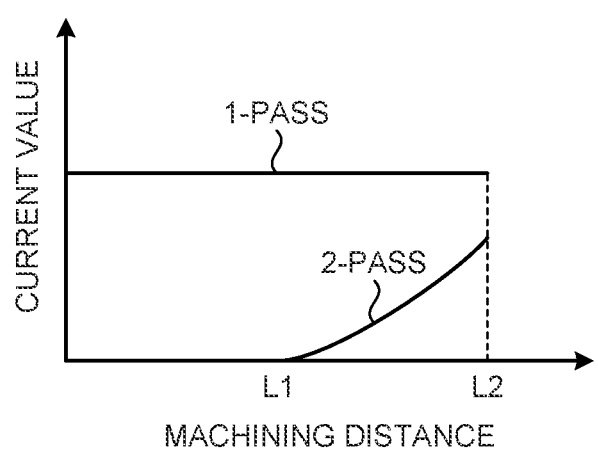
FIG. 7 is a graph representing a current value with respect to the machining distance at the time of two-pass machining of the cooling hole.
Figure 8:
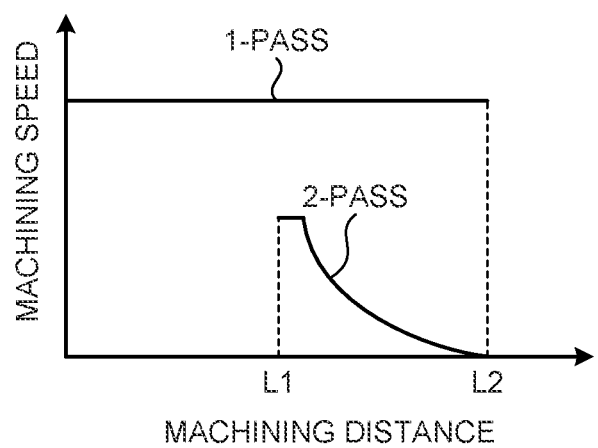
FIG. 8 is a graph representing the machining speed with respect to the machining distance at the time of two-pass machining of the cooling hole.

In the above description, after forming the first cooling hole 53 by electrolytic machining by moving the electrolytic machining tool 101 in the region A1, the electrolytic machining tool 101 is moved in the region A2 to form the second cooling hole 55 by one-pass electrolytic machining. However, the embodiment is not limited thereto. FIG. 7 is a graph representing the current value with respect to the machining distance at the time of two-pass machining of the cooling hole, and FIG. 8 is a graph representing the machining speed with respect to the machining distance at the time of two-pass machining of the cooling hole.

As illustrated in FIG. 7, up to the machining distance L2 corresponding to the region A1+A2, the electrolytic machining tool 101 is moved while keeping the current value and the machining speed constant to form the first cooling hole 53 the inner diameter of which is constant and a basic second cooling hole in the first pass. Thereafter, the electrolytic machining tool 101 is moved from the machining distance L1 corresponding to the region A1 to the machining distance L2 corresponding to the region A1+A2 while increasing the current value to form the second cooling hole 54 the inner diameter of which is gradually increased in the second pass. Alternatively, as illustrated in FIG. 8, up to the machining distance L2 corresponding to the region A1+A2, the electrolytic machining tool 101 is moved while keeping the current value and the machining speed constant to form the first cooling hole 53 the inner diameter of which is constant and the basic second cooling hole in the first pass. Thereafter, the electrolytic machining tool 101 is moved from the machining distance L1 corresponding to the region A1 to the machining distance L2 corresponding to the region A1+A2 while lowering the machining speed to form the second cooling hole 54 the inner diameter of which is gradually increased in the second pass. An outer diameter of the electrode of the electrolytic machining tool 101 in the second pass is the same as the outer diameter of the electrode of the electrolytic machining tool 101 in the first pass. The outer diameter of the electrode of the electrolytic machining tool 101 in the second pass may be caused to be larger than the outer diameter of the electrode of the electrolytic machining tool 101 in the first pass. A moving direction of the electrolytic machining tool 101 may be a direction from the machining distance L2 toward the machining distance L1.

Figure 9:
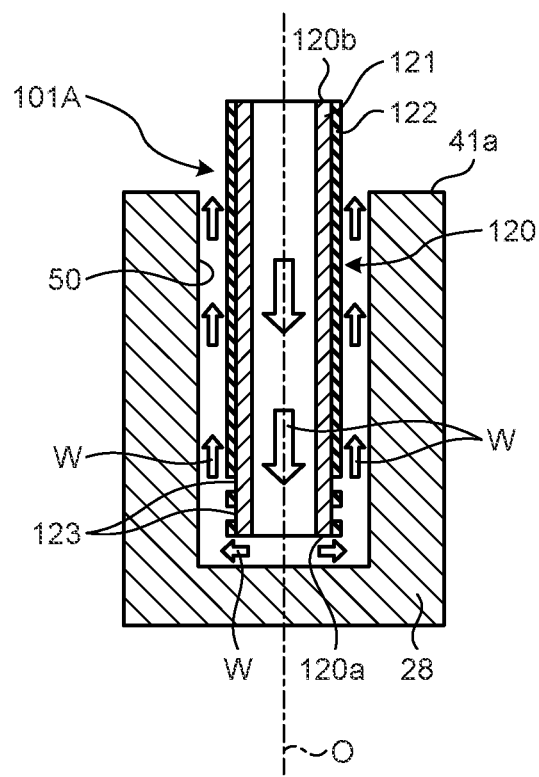
FIG. 9 is a cross-sectional view for explaining a first modification of the manufacturing method for a turbine blade.

At the time of moving the electrolytic machining tool 101 to form the second cooling hole 54, the electrolytic machining amount is large, so that a distance between the electrolytic machining tool 101 and an inner surface of the second cooling hole 54 may be increased, solution resistance may be increased, and a machining property may be lowered. FIG. 9 is a cross-sectional view for explaining a first modification of the manufacturing method for a turbine blade, and FIG. 10 is a schematic diagram illustrating the electrolytic machining tool.

Figure 10:
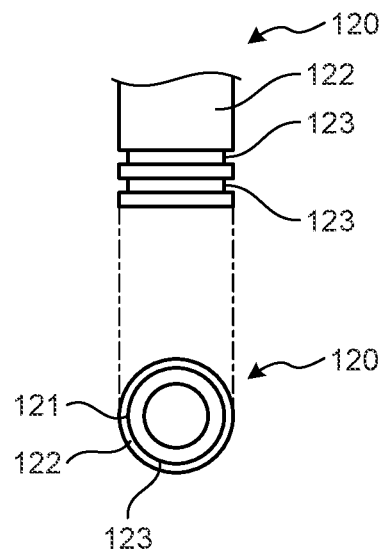
FIG. 10 is a schematic diagram illustrating an electrolytic machining tool.

As illustrated in FIG. 9 and FIG. 10, an electrolytic machining tool 101A includes a tool main body 120 including an electrode 121 and an insulating layer 122 that covers the electrode 121 from an outer circumference, and having a cylindrical shape as a whole.

The electrode 121 of the tool main body 120 has a cylindrical shape extending along the axis O. In the electrode 121, the electrolytic solution W used for electrolytic machining is caused to flow from a base end 120b toward a front end 120a of the tool main body 120. In the tool main body 120, an outer peripheral surface of the electrode 121 is coated by the insulating layer 122, and an end face of the electrode 121 on the front end 120a is not covered by the insulating layer 122, so that the electrode 121 is exposed.

A non-insulation part 123 is disposed on the tool main body 120. The non-insulation part 123 is formed to be opposed to the rotor blade 28 in a radial direction such that the outer peripheral surface of the electrode 121 is exposed in a ring shape around the axis O across the entire region in the circumferential direction at a middle position close to the front end 120a between the front end 120a and the base end 120b of the tool main body 120. Two non-insulation parts 123 are formed at intervals in the axis O direction, but it is sufficient that at least one non-insulation part 123 is formed.

Energization can be caused between the non-insulation part 123 and the rotor blade 28 via the electrolytic solution W led out from the front end 120a of the tool main body 120.

In electrolytic machining, when the non-insulation part 123 is formed, energization can be caused not only between the rotor blade 28 and the end face facing the axis O direction of the front end 120a of the tool main body 120 but also between the rotor blade 28 and the outer peripheral surface of the electrode 121. Due to this, an energization area with respect to the rotor blade 28 is increased, and the machining speed can be improved while preventing a rise in an applied voltage. At the time of forming the second cooling hole 54, even when a distance between the electrolytic machining tool 101A and the inner surface of the second cooling hole 54 is increased and the solution resistance is increased, the machining property can be prevented from being lowered.

Figure 11:
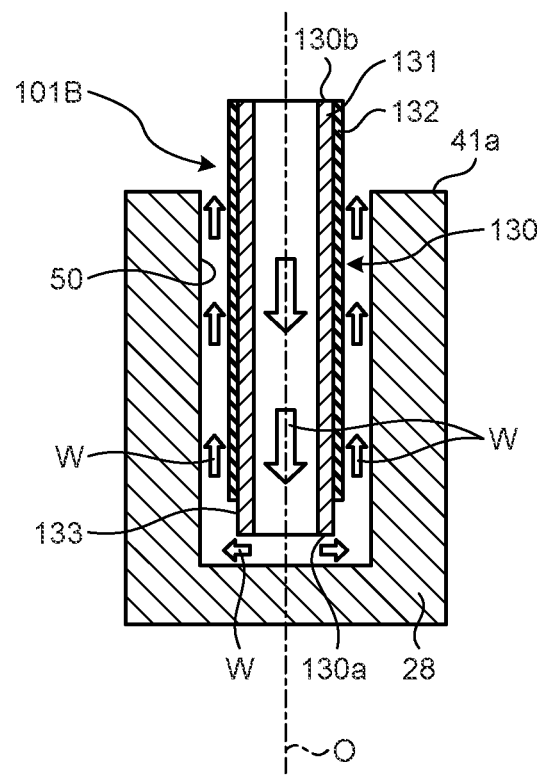
FIG. 11 is a cross-sectional view for explaining a second modification of the manufacturing method for a turbine blade.
Figure 12:
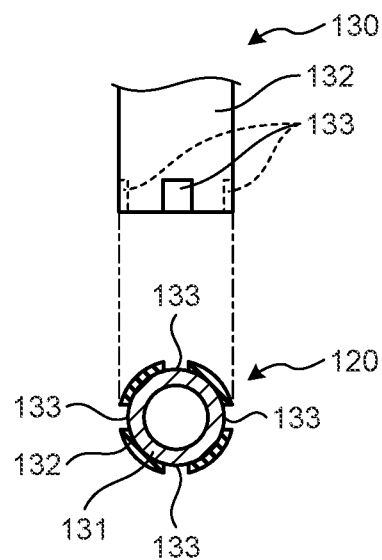
FIG. 12 is a schematic diagram illustrating the electrolytic machining tool.

FIG. 11 is a cross-sectional view for explaining a second modification of the manufacturing method for a turbine blade, and FIG. 12 is a schematic diagram illustrating the electrolytic machining tool.

As illustrated in FIG. 11 and FIG. 12, an electrolytic machining tool 101B includes a tool main body 130 including an electrode 131 and an insulating layer 132 that covers the electrode 131 from an outer circumference, and having a cylindrical shape as a whole.

The electrode 131 of the tool main body 130 has a cylindrical shape extending along the axis O. In the electrode 131, the electrolytic solution W used for electrolytic machining is caused to flow from a base end 130b toward a front end 130a of the tool main body 130. In the tool main body 130, an outer peripheral surface of the electrode 131 is coated by the insulating layer 132, and an end face of the electrode 131 on the front end 130a is not covered by the insulating layer 132, so that the electrode 131 is exposed.

A non-insulation part 133 is disposed on the tool main body 120. The non-insulation part 133 has a quadrangular shape when viewed from a radial direction, and is formed to extend in the axis O direction to be continuous to an exposed portion of the electrode 131 at an end face of the front end 130a of the tool main body 130 on the outer peripheral surface of the electrode 131. A plurality of the non-insulation parts 133 are formed to be arranged alternately with the insulating layer 132 at regular intervals in the circumferential direction, and four non-insulation parts 133 are formed in the first embodiment.

At the time of electrolytic machining, the non-insulation part 133 enables energization to be caused between the outer peripheral surface of the electrode 131 and the rotor blade 28, so that the energization area can be increased. At the time of forming the second cooling hole 54, even when a distance between the electrolytic machining tool 101A and the inner surface of the second cooling hole 54 is increased and the solution resistance is increased, the machining property can be prevented from being lowered.

As illustrated in FIG. 2, when the first cooling hole 53 and the second cooling hole 54 are continuously formed by electrolytic machining to communicate with the base end-side cooling hole 51, if a forming position of the second cooling hole 54 deviates in the axial direction Da or the circumferential direction Dc, the second cooling hole 54 does not communicate with the base end-side cooling hole 51. Thus, the cavity part 52 is disposed between the second cooling hole 54 and the base end-side cooling hole 51. That is, after forming the base end-side cooling hole 51 by electrolytically machining the rotor blade 28 from the base end toward the front end, the cavity part 52 is formed while keeping the current value constant and causing the machining speed to be slow speed or 0.

Figure 13:
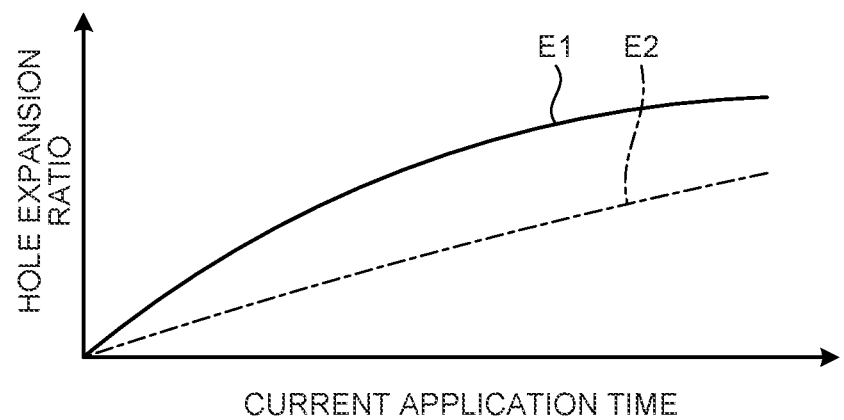
FIG. 13 is a graph representing a cooling hole expansion ratio with respect to a current application time.

FIG. 13 is a graph representing a cooling hole expansion ratio with respect to a current application time. In E1 in which a high voltage is applied to the electrode, the cooling hole expansion ratio is changed in a curved shape with respect to an increase in the current application time. In E2 in which a low voltage is applied to the electrode, the cooling hole expansion ratio seems to be changed in a linear shape with respect to an increase in the current application time. Based on such a relation among the applied pressure, the current application time, and the cooling hole expansion ratio, the inner diameter of the cavity part 52 is determined in accordance with inner diameters or position deviation amounts of the second cooling hole 54 and the base end-side cooling hole 51. By disposing the cavity part 52, even when the forming position of the second cooling hole 54 deviates in the axial direction Da or the circumferential direction Dc, the second cooling hole 54 can be caused to communicate with the base end-side cooling hole 51 via the cavity part 52.

Second Embodiment

Turbine Blade

Figure 14:
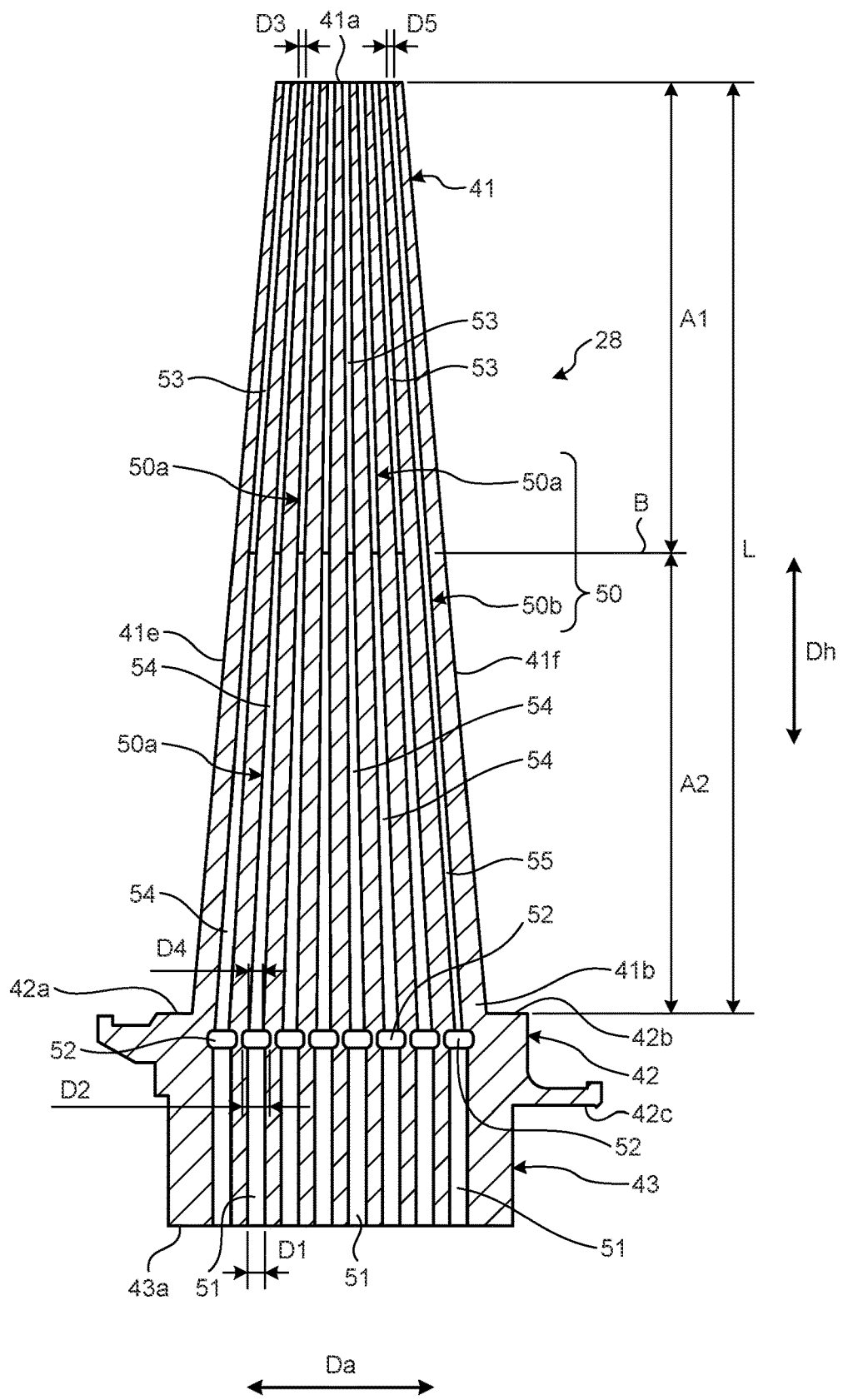
FIG. 14 is a vertical cross-sectional view illustrating a rotor blade as a turbine blade according to a second embodiment.

The following describes the rotor blade 28 as a turbine blade according to a second embodiment in detail. FIG. 14 is a vertical cross-sectional view illustrating the rotor blade as the turbine blade according to the second embodiment, and FIG. 15 is a schematic diagram illustrating a shape of the rotor blade at different positions in the blade height direction.

Figure 15:
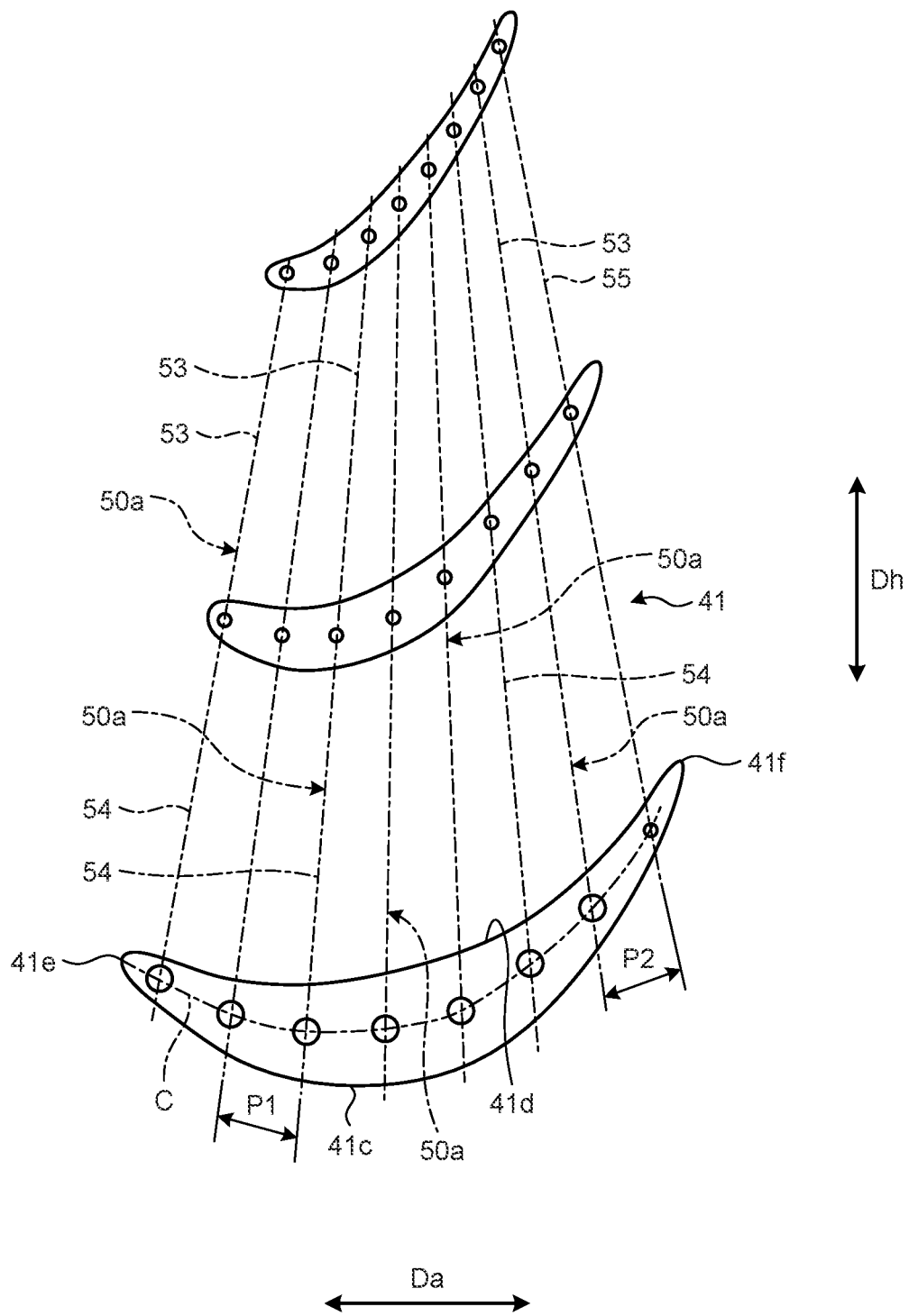
FIG. 15 is a schematic diagram illustrating a shape of the rotor blade at different positions in a blade height direction.

As illustrated in FIG. 14 and FIG. 15, the rotor blade 28 includes the blade part 41, the platform 42, and the blade root part 43. The blade part 41 has a long shape along the blade height direction Dh, and the front end 41a has a tapering shape with respect to the base end 41b such that a length in a front and rear direction and a width are reduced. The blade part 41 includes a negative pressure surface 41c having a convex surface shape, a positive pressure surface 41d having a concave surface shape, a leading edge 41e, and a trailing edge 41f. The blade part 41 has a blade cross-sectional shape in which the width is reduced from a middle part in the front and rear direction as the axial direction Da toward the leading edge 41e and the trailing edge 41f. The leading edge 41e is an end part on the most forward side (upstream side) in a direction in which a camber line C as a blade center line extends, and the trailing edge 41f is an end part on the most rearward side (downstream side) in the direction in which the camber line C extends. The blade part 41 has a blade cross-sectional shape in which the negative pressure surface 41c and the positive pressure surface 41d continue to each other via the leading edge 41e and the trailing edge 41f.

In the platform 42, the surfaces 42a and 42b are gas path surfaces, and the base end 41b of the blade part 41 is integrally connected to the surfaces 42a and 42b. The blade root part 43 has what is called a Christmas tree shape when viewed from the axial direction Da, and is integrally connected to the back surface 42c of the platform 42. The blade root part 43 is fixed to the outer peripheral part of the rotor 32 (refer to FIG. 1).

In the rotor blade 28, the cooling passages 50 are provided along the blade height direction Dh. The cooling passages 50 are disposed at intervals in the front and rear direction as the axial direction Da. The cooling passage 50 includes a first cooling passage 50a and a second cooling passage 50b.

The first cooling passage 50a includes a cooling hole (the second cooling hole 54 described later) the inner diameter of which is increased from the front end 41a toward the base end 41b of the blade part 41 by a predetermined first expansion ratio set in advance. The second cooling passage 50b includes a cooling hole (a third cooling hole 55 described later) that is positioned closer to the trailing edge 41f than the first cooling passage 50a is, and has an inner diameter that is constant from the front end 41a toward the base end 41b. In the second embodiment, a plurality of the first cooling passages 50a (seven in FIG. 14 and FIG. 15) are disposed, and the one second cooling passage 50b is provided in the trailing edge 41f. The second cooling passage 50b is positioned in the closest side to the trailing edge 41f of the blade part 41.

In this case, the first cooling passages 50a and the one second cooling passage 50b are provided along the camber line C (refer to FIG. 15). However, the first cooling passages 50a and the one second cooling passage 50b may be offset from the camber line C to the negative pressure surface 41c or the positive pressure surface 41d. An interval P1 between the first cooling passages 50a adjacent to each other is the same as an interval P2 between the first cooling passage 50a and the second cooling passage 50b adjacent to each other. However, a plurality of the intervals P1 may be caused to be different from each other, or the interval P2 may be lengthened or shortened with respect to the interval P1.

In the second embodiment, it is assumed that the second cooling passage 50b is positioned to be closer to the trailing edge 41f than the first cooling passage 50a is, and includes the cooling hole the inner diameter of which is constant from the front end 41a toward the base end 41b. However, the configuration is not limited thereto. For example, the second cooling passage 50b may include a cooling hole the inner diameter of which is increased from the front end 41a toward the base end 41b by a second expansion ratio smaller than the first expansion ratio.

The first cooling passage 50a includes the base end-side cooling hole 51, the cavity part 52, the first cooling hole 53, and the second cooling hole 54. The second cooling passage 50b includes the third cooling hole 55.

One end of the base end-side cooling hole 51 opens toward the base end of the rotor blade 28, that is, the base end 43a of the blade root part 43. The base end-side cooling hole 51 is provided along the blade height direction Dh, and has the constant inner diameter D1 along the blade height direction Dh. The cavity part 52 is provided in the platform 42 (or the blade root part 43). The cavity part 52 communicates with the other end part of the base end-side cooling hole 51. The inner diameter D2 of the cavity part 52 is larger than the inner diameter D1 of the base end-side cooling hole 51.

One end of the first cooling hole 53 opens toward the front end of the rotor blade 28, that is, the front end 41a of the blade part 41. The first cooling hole 53 is provided along the blade height direction Dh, and has the constant inner diameter D3 along the blade height direction Dh. One end of the second cooling hole 54 communicates with the other end of the first cooling hole 53, and the other end of the second cooling hole 54 communicates with the cavity part 52. The inner diameter of the second cooling hole 54 is gradually increased from D3 to D4 from one end toward the other end. The second cooling hole 54 has a tapered shape such that the inner diameter is continuously increased from one end toward the base end. The first cooling hole 53 smoothly communicates with the second cooling hole 54 without a level difference. The first cooling hole 53 may be coupled to the second cooling hole 54 via a curved surface.

The inner diameter D2 of the cavity part 52 is larger than the inner diameter D1 of the base end-side cooling hole 51, the inner diameter D1 of the base end-side cooling hole 51 is larger than the maximum inner diameter D4 of the second cooling hole 54, and the minimum inner diameter D3 of the second cooling hole 54 is the same as the inner diameter D4 of the first cooling hole 53. The inner diameter D3 of the second cooling hole 54 is gradually increased to be the inner diameter D4 from one end toward the other end, and the inner diameter expansion ratio of the second cooling hole 54 ranges from 100% to 250%. The inner diameter expansion ratio of the second cooling hole 54 preferably ranges from 100% to 175%. Herein, the inner diameter expansion ratio is an expansion ratio of the maximum inner diameter D4 at the other end with respect to the minimum inner diameter D3 at one end of the second cooling hole 54. Each of the base end-side cooling hole 51, the cavity part 52, the first cooling hole 53, the second cooling hole 54, and the third cooling hole 55 has a circular cross sectional shape, but may have a non-circular cross sectional shape such as an elliptic cross sectional shape. In this case, the inner diameter expansion ratio of the cooling hole 54 may be caused to be a passage area expansion ratio of the cooling hole 54. The expansion ratio of the passage area becomes the square of the inner diameter expansion ratio. The following describes a relation between the inner diameter expansion ratio and the passage area expansion ratio.

Inner diameter expansion ratio 175%→Area expansion ratio 306%

Inner diameter expansion ratio 250%→Area expansion ratio 625%.

The first cooling hole 53 is formed in the region A1 on the front end 41a of the blade part 41, and the second cooling hole 54 is formed in the region A2 on the base end 41b of the blade part 41. Assuming that a length along the blade height direction Dh including the first cooling hole 53 and the second cooling hole 54 is L(A1+A2), a length (A1) from one end of the first cooling hole 53 (the front end 41a of the blade part 41) to the position B where the first cooling hole 53 and the second cooling hole 54 are communicated with is 40% to 60% of a length (L) from one end of the first cooling hole 53 to the gas path surface on the base end. That is, the length (A1) from one end of the first cooling hole 53 to the position B where the first cooling hole 53 is communicated with the second cooling hole 54 is 40% to 60% of the length L from the front end 41a to the surface 42b of the platform 42 on the trailing edge along the blade height direction Dh.

The third cooling hole 55 is formed in a region of the length L(A1+A2) from the front end 41a to the base end 41b of the blade part 41.

Herein, the front end 41a of the blade part 41 is a position of an end face on the front end along the blade height direction Dh. In a structure in which a chip shroud is disposed at the front end 41a of the blade part 41, the front end 41a of the blade part 41 is a position of a gas path surface on the chip shroud. The base end 41b of the blade part 41 is a position of an end face on the base end along the blade height direction Dh, and is positions of the surfaces 42a and 42b as gas path surfaces of the platform 42. In a case of defining the length along the blade height direction Dh of the blade part 41, the length is a length on a side of the front end 41a and the surface 43b as a position on the trailing edge (right side in FIG. 14) of the blade part 41.

The cooling air passes through the first cooling passages 50a and the one second cooling passage 50b as the cooling passages 50 to cool the rotor blade 28. That is, the cooling air is supplied to the base end part of the rotor blade 28, passes through the base end-side cooling hole 51, the cavity part 52, the second cooling hole 54, and the first cooling hole 53 to be discharged to the outside, and passes through the base end-side cooling hole 51, the cavity part 52, and the third cooling hole 55 to be discharged to the outside. At this time, the rotor blade 28 is cooled by the cooling air passing through the base end-side cooling hole 51, the cavity part 52, the second cooling hole 54, the first cooling hole 53, and the third cooling hole 55. First, in the rotor blade 28, the platform 42 and the blade root part 43 are cooled when the cooling air flows through the base end-side cooling hole 51 and the cavity part 52. Next, the blade part 41 is cooled when the cooling air flows through the second cooling hole 54 and the first cooling hole 53 from the cavity part 52, and flows through the third cooling hole 55.

Typically, the creep strength of the rotor blade 28 is sufficient at a base end part in the blade height direction Dh of the blade part 41, but the creep strength is the most severe in the vicinity of the middle of the blade height direction Dh of the blade part 41. However, the cooling air flows through the base end-side cooling hole 51, the cavity part 52, the second cooling hole 54, the first cooling hole 53, and the third cooling hole 55 in this order to cool the rotor blade 28. Accordingly, the blade part 41 is cooled by the cooling air the temperature of which is raised by cooling the platform 42 and the blade root part 43. That is, it becomes difficult to efficiently cool the middle position in the blade height direction Dh of the blade part 41 having a high heat load by the cooling air.

Thus, in the second embodiment, the second cooling hole 54 disposed at a position close to the platform 42 in the first cooling passage 50a is caused to have a tapered shape. That is, the inner diameter of the second cooling hole 54 to communicate with the cavity part 52 is increased as the maximum inner diameter D4, and the inner diameter of the second cooling hole 54 to communicate with the first cooling hole 53 is reduced as the minimum inner diameter D3. On the other hand, the inner diameter of the first cooling hole 53 is constant as the inner diameter D3. The position where the first cooling hole 53 and the second cooling hole 54 are communicated with is caused to be the middle position in the blade height direction Dh of the blade part 41. To cause the first cooling hole 53 to communicate with the second cooling hole 54 without a level difference, the inner diameter of the second cooling hole 54 is continuously changed from the maximum inner diameter D4 to the minimum inner diameter D3.

On the other hand, in the second cooling passage 50b, it is assumed that the third cooling hole 55 has a straight shape the inner diameter D5 of which is constant in a longitudinal direction. The blade part 41 has a blade cross-sectional shape the width of which is reduced toward the leading edge 41e and the trailing edge 41f. Thus, when the third cooling hole 55 of the second cooling passage 50b is caused to have a tapered shape like the second cooling hole 54 of the first cooling passage 50a, and the inner diameter communicating with the cavity part 52 is increased, the thickness of the blade part 41 around the third cooling hole 55 is reduced. However, a center part of the blade part 41 is thicker than the leading edge 41e or the trailing edge 41f, so that the tapered shape like the second cooling hole 54 can be used, and the inner diameter communicating with the cavity part 52 can be increased.

Thus, the cooling air supplied to the base end part of the rotor blade 28 is introduced into the cavity part 52 from the base end-side cooling hole 51, and flows from the cavity part 52 to the second cooling hole 54 and the first cooling hole 53 to be discharged to the outside. The cooling air is introduced into the cavity part 52 from the base end-side cooling hole 51, and flows from the cavity part 52 to the third cooling hole 55 to be discharged to the outside. At this time, the inner diameters of the base end-side cooling hole 51 and the cavity part 52 are larger than those of the second cooling hole 54 and the first cooling hole 53, so that the flow velocity of the cooling air is low. The inner diameter of the second cooling hole 54 of the first cooling passage 50a is gradually reduced toward the first cooling hole 53, so that the flow velocity of the cooling air is gradually increased, and the cooling air flows through the first cooling hole 53 at the highest velocity.

That is, when the cooling air flows from the base end-side cooling hole 51 and the cavity part 52 to the second cooling hole 54, the flow velocity thereof is lower as compared with that in a conventional cooling hole the inner diameter of which is constant along the blade height direction Dh (hereinafter, referred to as a conventional cooling hole), so that the cooling air is prevented from being heated up on the base end on which the creep strength is relatively enough. On the other hand, when the cooling air flows from the second cooling hole 54 to the first cooling hole 53, the flow velocity thereof is higher than that in the conventional cooling hole, and the cooling air is prevented from being heated up on the base end, so that cooling efficiency is improved. That is, the blade part 41 can be efficiently cooled at a part from the middle position having the highest heat load in the vicinity of the middle in the blade height direction Dh to the front end.

The third cooling hole 55 of the second cooling passage 50b has a straight shape, and the flow velocity of the cooling air is constant. However, the third cooling hole 55 is disposed at the trailing edge 41f having a narrow width of the blade part 41, and the trailing edge 41f can be properly cooled by the cooling air.

Manufacturing Method for Turbine Blade

The following describes the manufacturing method for the rotor blade 28 as the turbine blade according to the second embodiment, specifically, a method of forming the cooling passage 50 in the rotor blade 28. A configuration and a function of an electrolytic machining device used in the manufacturing method according to the present embodiment are the same as those of the electrolytic machining device according to the first embodiment illustrated in FIG. 3 and FIG. 4, so that the description thereof will not be repeated.

As illustrated in FIG. 14 and FIG. 15, in the rotor blade 28 according to the second embodiment, the cooling passage 50 includes the first cooling passage 50a and the second cooling passage 50b. The first cooling passage 50a includes the base end-side cooling hole 51, the cavity part 52, the first cooling hole 53, and the second cooling hole 54. The inner diameter of the second cooling hole 54 is gradually increased from the minimum inner diameter D3 to the maximum inner diameter D4 from one end toward the other end. The second cooling passage 50b includes the third cooling hole 55, and the inner diameter D5 of the third cooling hole 55 is constant from one end toward the other end.

The manufacturing method for a turbine blade according to the second embodiment is used for forming the first cooling passage 50a and the second cooling passage 50b constituting the cooling passage 50. The manufacturing method for a turbine blade according to the second embodiment is used for forming the base end-side cooling hole 51, the cavity part 52, the first cooling hole 53, and the second cooling hole 54 constituting the first cooling passage 50a, and for forming the base end-side cooling hole 51, the cavity part 52, and the third cooling hole 55 constituting the second cooling passage 50b.

The manufacturing method for a turbine blade according to the second embodiment includes a step of forming the first cooling passage 50a the inner diameter of which is increased by the first expansion ratio along the blade height direction Dh by electrolytic machining while adjusting at least one of the current value and the machining speed from the front end 41a toward the base end 41b of the rotor blade 28, and a step of forming the second cooling passage 50b the inner diameter of which is constant or increased by the second expansion ratio smaller than the first expansion ratio along the blade height direction Dh by electrolytic machining while adjusting at least one of the current value and the machining speed from the front end 41a toward the base end 41b of the rotor blade 28. The manufacturing method for the cooling hole constituting the first cooling passage 50a is the same as the manufacturing method for the cooling hole constituting the cooling passage 50 according to the first embodiment described above with reference to FIG. 5 to FIG. 13, so that the description thereof will not be repeated.

Regarding the base end-side cooling hole 51 and the cavity part 52, the manufacturing method for the cooling hole constituting the second cooling passage 50b is the same as the manufacturing method for the base end-side cooling hole 51 and the cavity part 52 constituting the first cooling passage 50a. In a case of causing the inner diameter of the third cooling hole 55 constituting the second cooling passage 50b to be constant, the electrolytic machining tool 101 is moved from the front end to the base end of the rotor blade 28 while keeping the current value and the machining speed constant to form the third cooling hole 55 the inner diameter of which is unchanged and constant by electrolytic machining. Specifically, the electrolytic machining tool 101 is moved from the front end 41a over the machining distance L corresponding to the region A1 and the region A2 while keeping the current value and the machining speed constant to form the third cooling hole 55 the inner diameter of which is constant.

In a case of gradually increasing the inner diameter of the third cooling hole 55 constituting the second cooling passage 50b by the second expansion ratio smaller than the first expansion ratio, the electrolytic machining tool 101 is moved from the front end of the rotor blade 28 to the base end of the rotor blade 28 while changing at least one of the current value and the machining speed to form the third cooling hole 54 the inner diameter of which is gradually increased by electrolytic machining.

Specifically, the electrolytic machining tool 101 is moved from the front end 41a over the machining distance L corresponding to the region A1+A2 while increasing the current value to form the third cooling hole 55 the inner diameter of which is gradually increased. Alternatively, the electrolytic machining tool 101 is moved from the front end 41a over the machining distance L corresponding to the region A1+A2 while lowering the machining speed to form the third cooling hole 55 the inner diameter of which is gradually increased. At this point, a change rate for changing the current value or the machining speed may be appropriately set depending on the shape of the third cooling hole 55.

To increase the inner diameter of the third cooling hole 55 by the second expansion ratio smaller than the first expansion ratio, the current value and the machining speed at the manufacturing step for the third cooling hole 55 are determined as compared with the current value and the machining speed at the manufacturing step for the second cooling hole 54 constituting the first cooling passage 50a. For example, in a case in which the current value is increased at the manufacturing step for the second cooling hole 54, the current is increased at the manufacturing step for the third cooling hole 55 at a lower increasing rate. In a case in which the machining speed is lowered at the manufacturing step for the second cooling hole 54, the machining speed at the manufacturing step for the third cooling hole 55 is lowered at a lower lowering rate. Due to this, the inner diameter of the third cooling hole 55 can be increased by the second expansion ratio smaller than the first expansion ratio.

At the time of moving the electrolytic machining tool 101 to form the third cooling hole 55, the electrolytic machining amount is gradually increased, so that a hydrogen gas generated during machining may be increased, and discharging performance of sludge may be deteriorated. Thus, it is preferable to gradually increase the flow velocity of the electrolytic solution W.

Third Embodiment

Figure 16:
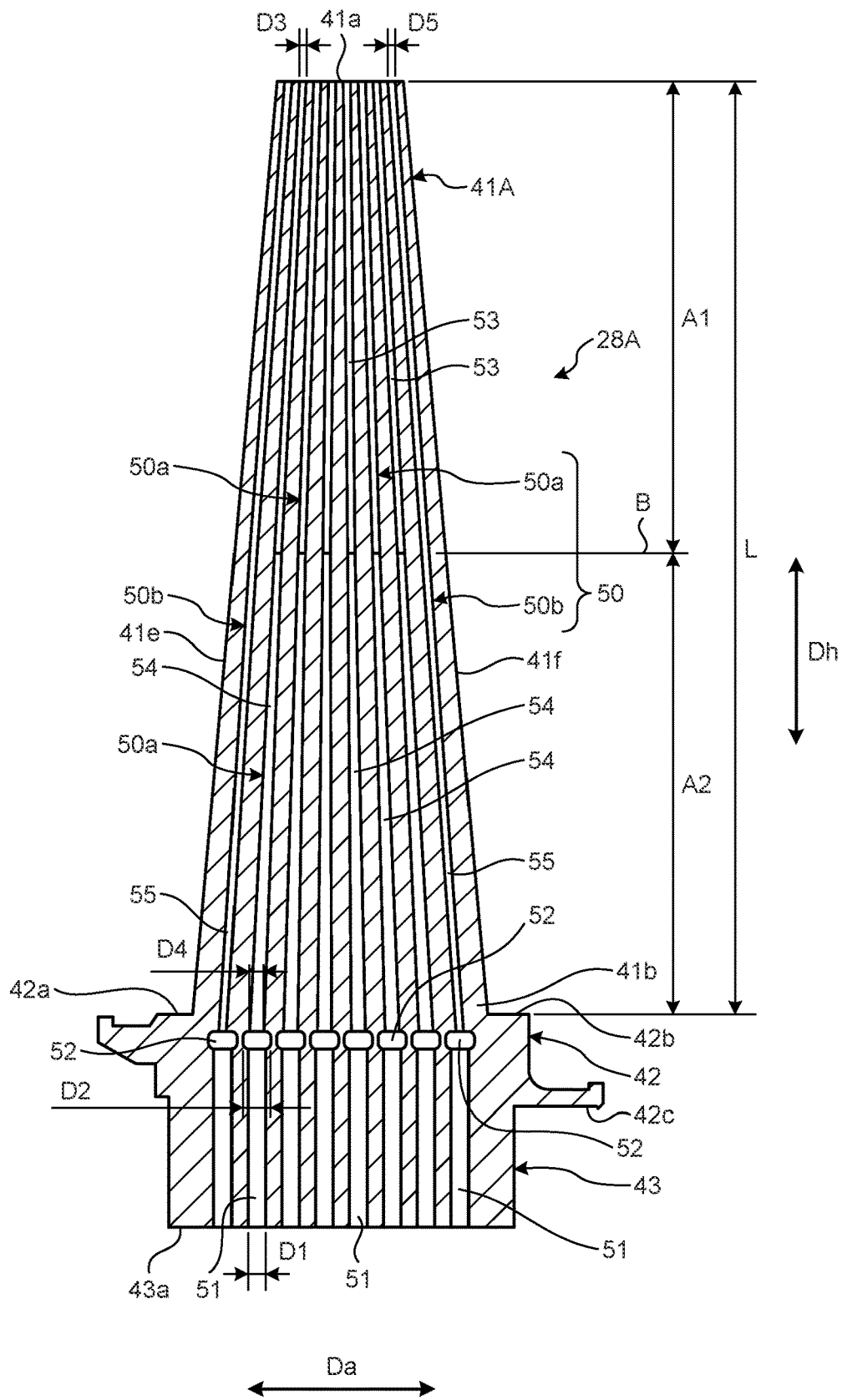
FIG. 16 is a vertical cross-sectional view illustrating a rotor blade as a turbine blade according to a third embodiment.
Figure 17:
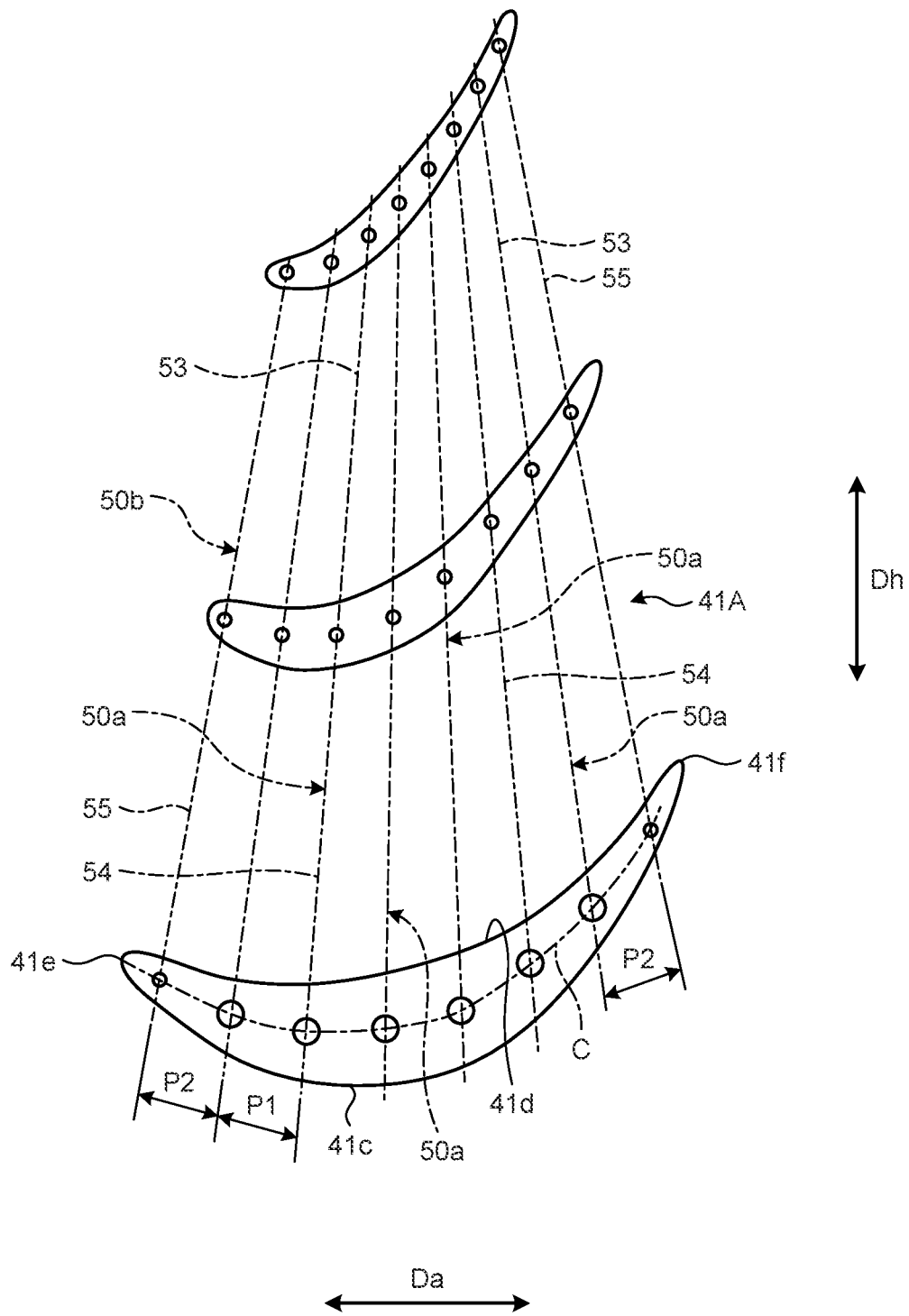
FIG. 17 is a schematic diagram illustrating a shape of the rotor blade at different positions in the blade height direction.

FIG. 16 is a vertical cross-sectional view illustrating the rotor blade as the turbine blade according to the second embodiment, and FIG. 17 is a schematic diagram illustrating the shape of the rotor blade at different positions in the blade height direction. A member having the same function as that in the second embodiment described above is denoted by the same reference numeral, and detailed description thereof will not be repeated.

As illustrated in FIG. 16 and FIG. 17, a rotor blade 28A includes a blade part 41A, the platform 42, and the blade root part 43. In the rotor blade 28A, the cooling passages 50 are provided along the blade height direction Dh. The cooling passages 50 are disposed at intervals in the front and rear direction as the axial direction Da. The cooling passage 50 includes the first cooling passage 50a and the second cooling passage 50b.

The first cooling passage 50a includes the second cooling hole 54 the inner diameter of which is increased by the predetermined first expansion ratio set in advance from the front end 41a toward the base end 41b of the blade part 41A. The second cooling passage 50b includes the third cooling hole 55 that is positioned to be closer to the leading edge 41e than the first cooling passage 50a is and positioned to be closer to the trailing edge 41f, the inner diameter of the third cooling hole 55 being constant from the front end 41a toward the base end 41b. In the third embodiment, a plurality of the first cooling passages 50a (six in FIG. 16 and FIG. 17) are disposed, and two second cooling passages 50b in total are provided in the leading edge 41e and the trailing edge 41f, respectively. The second cooling passages 50b are positioned in the closest sides to the leading edge 41e and the trailing edge 41f of the blade part 41A, respectively.

In this case, the first cooling passages 50a and the two second cooling passages 50b are provided along the camber line C. The interval P1 between the first cooling passages 50a adjacent to each other is the same as the interval P2 between the first cooling passage 50a and the second cooling passage 50b adjacent to each other. However, the intervals P1 may be caused to be different from each other, or the interval P2 may be lengthened or shortened with respect to the interval P1.

In the third embodiment, it is assumed that the second cooling passages 50b are positioned to be closer to the leading edge 41e and the trailing edge 41f than the first cooling passage 50a is, respectively, and each include the cooling hole the inner diameter of which is constant from the front end 41a toward the base end 41b. However, the configuration is not limited thereto. For example, the second cooling passage 50b may include the cooling hole the inner diameter of which is increased from the front end 41a toward the base end 41b by the second expansion ratio smaller than the first expansion ratio. The expansion ratio of the second cooling passage 50b on the leading edge 41e and the expansion ratio of the second cooling passage 50b on the trailing edge 41f may be the same or different from each other.

The configurations of the first cooling passage 50a and the second cooling passage 50b are the same as those in the second embodiment, so that the description thereof will not be repeated.

Fourth Embodiment

Figure 18:
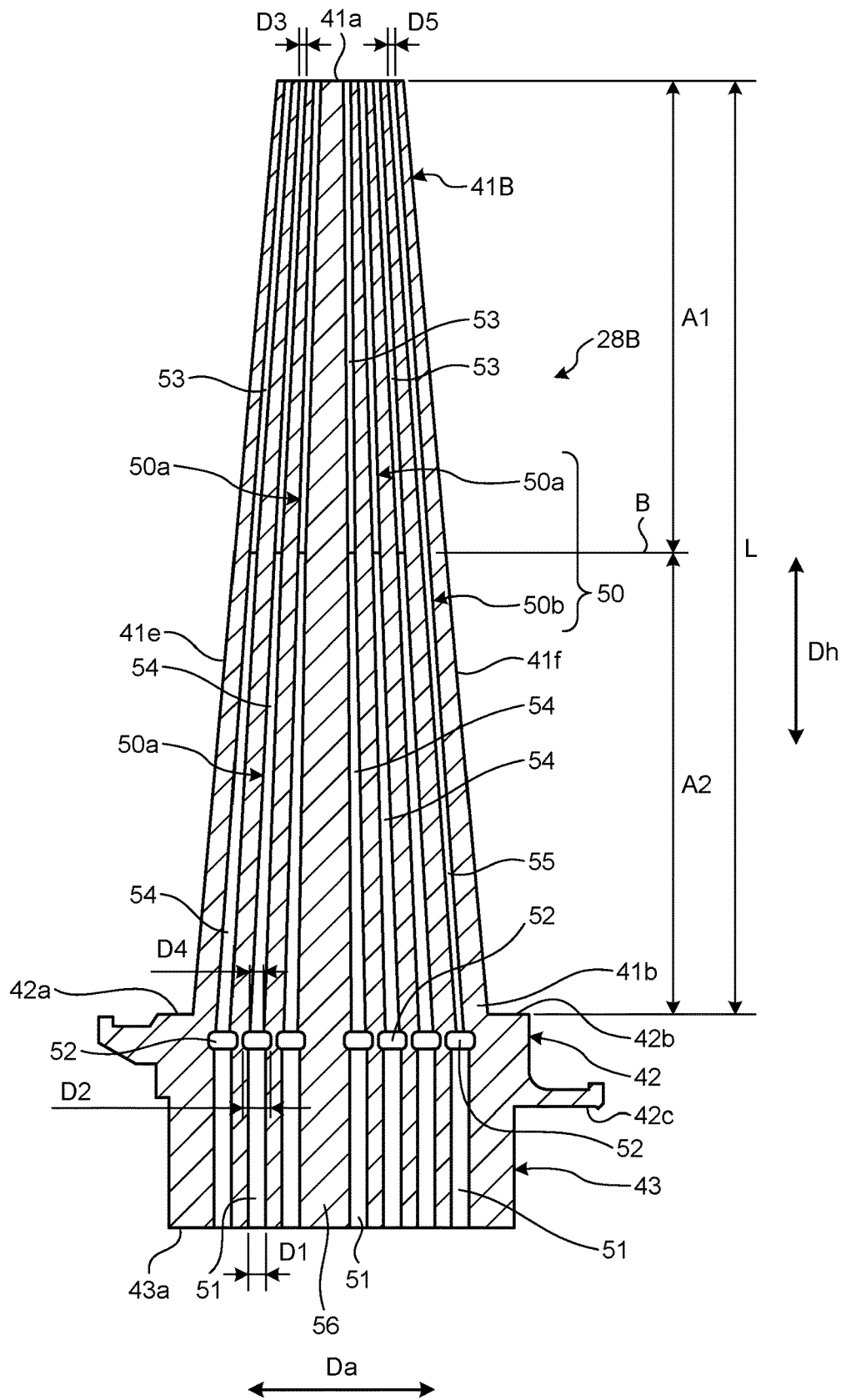
FIG. 18 is a vertical cross-sectional view illustrating a rotor blade as a turbine blade according to a fourth embodiment.
Figure 19:
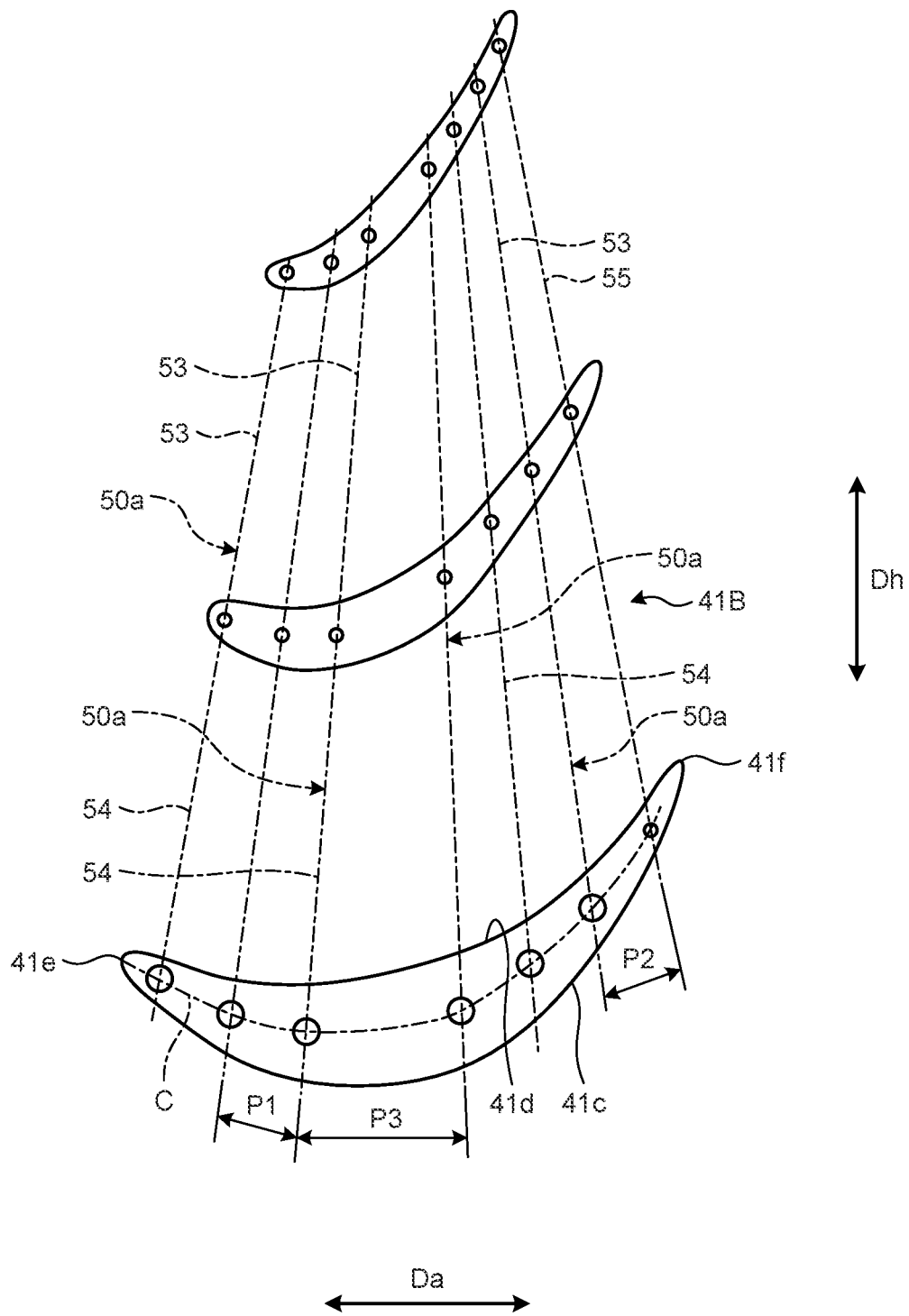
FIG. 19 is a schematic diagram illustrating a shape of the rotor blade at different positions in the blade height direction.

FIG. 18 is a vertical cross-sectional view illustrating the rotor blade as a turbine blade according to a fourth embodiment, and FIG. 19 is a schematic diagram illustrating the shape of the rotor blade at different positions in the blade height direction. A member having the same function as that in the second embodiment described above is denoted by the same reference numeral, and detailed description thereof will not be repeated.

As illustrated in FIG. 18 and FIG. 19, a rotor blade 28B includes a blade part 41B, the platform 42, and the blade root part 43. In the rotor blade 28B, the cooling passages 50 are provided along the blade height direction Dh. The cooling passages 50 are disposed at intervals in the front and rear direction as the axial direction Da. The cooling passage 50 includes the first cooling passage 50a and the second cooling passage 50b.

The first cooling passage 50a includes the second cooling hole 54 the inner diameter of which is increased from the front end 41a toward the base end 41b of the blade part 41B by the predetermined first expansion ratio set in advance. The second cooling passage 50b includes the third cooling hole 55 that is positioned to be closer to the trailing edge 41f than the first cooling passage 50a is, the inner diameter of the third cooling hole 55 being constant from the front end 41a toward the base end 41b. For example, a plurality of the first cooling passages 50a (six in FIG. 18 and FIG. 19) are disposed, and the one second cooling passage 50b is provided in the trailing edge 41f. The second cooling passage 50b is positioned in the closest side to the trailing edge 41f of the blade part 41. The second cooling passage 50b may be provided in the leading edge 41e of the blade part 41, or may be provided in both of the leading edge 41e and the trailing edge 41f of the blade part 41.

In the rotor blade 28B, a non-cooling part 56 not including the first cooling passage 50a is disposed at a middle part in the front and rear direction. The non-cooling part 56 is disposed between a pair of the adjacent first cooling passages 50a disposed at a center part in the front and rear direction. The non-cooling part 56 is formed such that the blade part 41B, the platform 42, and the blade root part 43 are continuous to each other along the blade height direction Dh.

Regarding the first cooling passages 50a provided closer to the leading edge 41e than the non-cooling part 56, the intervals P1 between the adjacent first cooling passages 50a are the same. Regarding the first cooling passages 50a and the second cooling passage 50b disposed to be closer to the trailing edge 41f than the non-cooling part 56, the interval P1 between the adjacent first cooling passages 50a is the same as the interval P2 between the first cooling passage 50a and the second cooling passage 50b adjacent to each other. On the other hand, an interval P3 between the adjacent first cooling passages 50a that are provided in both sides across the non-cooling part 56 is larger than the interval P1.

The configurations of the first cooling passage 50a and the second cooling passage 50b are the same as those in the second embodiment, so that the description thereof will not be repeated.

Working Effects of Embodiments

In the turbine blade according to the first embodiment, the cooling passage 50 is provided along the blade height direction Dh. The cooling passage 50 includes the first cooling hole 53 including one end opening toward the front end and having an inner diameter that is constant along the blade height direction Dh, and the second cooling hole 54 including one end communicating with the other end of the first cooling hole 53 and having an inner diameter that is increased toward the base end. The length from one end of the first cooling hole 53 to the position where the first cooling hole 53 and the second cooling hole 54 are communicated with is 40% to 60% of the length from one end of the first cooling hole 53 to the surface (gas path surface) 43b on the base end.

Thus, the cooling air supplied to the base end passes through the second cooling hole 54 and the first cooling hole 53 to be discharged to the front end. At this time, the inner diameter of the second cooling hole 54 is increased toward the base end, so that the flow velocity of the cooling air flowing through the second cooling hole 54 is gradually increased before the cooling air flows into the first cooling hole 53. The position where the first cooling hole 53 and the second cooling hole 54 are communicated with is 40% to 60% of the length from one end of the first cooling hole 53 to the surface 43b on the base end, so that the velocity of the cooling air flowing through the cooling passage 50 is reduced on the base end, and is increased from the middle position to the front end. Due to this, a part from the middle position having a high heat load to the front end can be actively cooled by the cooling air. As a result, the rotor blade 28 can be efficiently cooled, so that cooling performance can be improved.

In the turbine blade according to the first embodiment, the cooling passage 50 includes the base end-side cooling hole 51 including one end opening toward the base end, and the cavity part 52 having the inner diameter larger than the inner diameter of the base end-side cooling hole 51 and communicating with the other end of the second cooling hole 54 and the other end of the base end-side cooling hole 51. Thus, the cooling air supplied to the base end is introduced from the base end-side cooling hole 51 to the cavity part 52, and passes through the cavity part 52 and the second cooling hole 54 to be introduced into the first cooling hole 53, so that the cooling air can be properly supplied into the blade.

In the turbine blade according to the first embodiment, the cooling passage 50 is provided along the blade height direction Dh. The cooling passage 50 includes the base end-side cooling hole 51 including one end opening toward the base end, the cavity part 52 having the inner diameter larger than the inner diameter of the base end-side cooling hole 51 and communicating with the other end of the base end-side cooling hole 51, the first cooling hole 53 including one end opening toward the front end and having an inner diameter that is constant along the blade height direction Dh, and the second cooling hole 54 including one end communicating with the other end of the first cooling hole 53 and the other end communicating with the cavity part 52, the inner diameter of the second cooling hole 54 being increased toward the base end.

Thus, the cooling air supplied to the base end is introduced into the cavity part 52 from the base end-side cooling hole 51, passes through the cavity part 52 and the second cooling hole 54 to be introduced into the first cooling hole 53, and is discharged to the front end. At this time, the inner diameter of the second cooling hole 54 is increased toward the base end, so that the flow velocity of the cooling air flowing through the second cooling hole 54 is gradually increased before the cooling air flows into the first cooling hole 53. The velocity of the cooling air flowing through the cooling passage 50 is reduced on the base end, and increased on the front end thereafter. Due to this, a part from the middle position having a high heat load to the front end can be actively cooled by the cooling air. As a result, the rotor blade 28 can be efficiently cooled, so that cooling performance can be improved.

In the turbine blade according to the first embodiment, the length from one end of the first cooling hole 53 to the position where the first cooling hole 53 and the second cooling hole 54 are communicated with is 40% to 60% of the length from one end of the first cooling hole 53 to the surface 43b on the base end. Due to this, a part from the middle position having a high heat load to the front end can be actively cooled by the cooling air.

In the turbine blade according to the first embodiment, the second cooling hole 54 has a tapered shape the inner diameter of which is continuously increased toward the base end. Thus, the second cooling hole 54 has the tapered shape without a level difference and the like, so that stress concentration can be prevented from being caused.

In the turbine blade according to the first embodiment, the cavity part 52 is provided in the platform 42. Due to this, the cavity part 52 having the inner diameter larger than that of the second cooling hole 54 or the base end-side cooling hole 51 can be easily formed.

In the turbine blade according to the first embodiment, the inner diameter of the base end-side cooling hole 51 is larger than the maximum inner diameter of the second cooling hole 54. Due to this, the flow velocity of the cooling air flowing through the base end-side cooling hole 51 can be reduced, and the cooling air having a lower temperature can be supplied from the second cooling hole 54 to the first cooling hole 53.

In the turbine blade according to the first embodiment, the inner diameter expansion ratio of the second cooling hole 54 is larger than 100% and smaller than 200%. Thus, the front end of the rotor blade 28 can be efficiently cooled by reducing the flow velocity of the cooling air flowing in the base end of the second cooling hole 54, supplying the cooling air having a lower temperature from the second cooling hole to the first cooling hole, and increasing the flow velocity of the cooling air flowing in the front end of the second cooling hole 54.

In the turbine blade according to the second embodiment, regarding each of the rotor blades 28, 28A, and 28B in which the cooling passages 50 along the blade height direction Dh are disposed at intervals in the axial direction Da, the cooling passage 50 includes the first cooling passage 50a including the second cooling hole 54 the inner diameter of which is increased from the front end 41a toward the base end 41b by the first expansion ratio, and the second cooling passage 50b including the third cooling hole 55 the inner diameter of which is constant or increased by the second expansion ratio smaller than the first expansion ratio from the front end 41a toward the base end 41b.

Thus, the cooling air supplied to the base end 41b passes through the first cooling passage 50a and the second cooling passage 50b and is discharged toward the front end 41a. In this case, the first cooling passage 50a includes the second cooling hole 54 the inner diameter of which is increased toward the base end, so that the flow velocity of the cooling air flowing through the second cooling hole 54 is gradually increased. Due to this, a part from the middle position having a high heat load to the front end 41a can be actively cooled by the cooling air. In this case, the second cooling passage 50b positioned to be closer to the leading edge 41e or the trailing edge 41f than the first cooling passage 50a is has the constant inner diameter, or has the inner diameter slightly increased toward the base end. Thus, the first expansion ratio of the first cooling passage 50a can be set irrespective of the shape of the second cooling passage 50b. As a result, the rotor blade 28 can be efficiently cooled, so that cooling performance can be improved.

In the turbine blade according to the third embodiment, the rotor blade 28 has a shape in which a width of a blade cross section is narrowed from the middle part in the axial direction Da toward the leading edge 41e and the trailing edge 41f, and the second cooling passage 50b is positioned in the closest side to the leading edge 41e or in the closest side to the trailing edge 41f. Due to this, the closest side to the leading edge 41e and the closest side to the trailing edge 41f can be properly cooled by the cooling air without lowering the strength of the second cooling passage 50b having the narrow width.

Regarding the turbine blade according to the second or the third embodiment, the first expansion ratio is the expansion ratio of an inner diameter dimension, and ranges from 100% to 250%. Due to this, the front end of the rotor blade 28 can be efficiently cooled by reducing the flow velocity of the cooling air flowing in the base end 41b of the first cooling passage 50a, supplying the cooling air having a lower temperature from the middle part to the front end 41a, and increasing the flow velocity of the cooling air flowing in the front end of the first cooling passage 50*a*.

Regarding the turbine blade according to the second or the third embodiment, the first expansion ratio is the passage area expansion ratio based on the inner diameter dimension, and ranges from 100% to 306%. Due to this, the front end of the rotor blade 28 can be efficiently cooled by reducing the flow velocity of the cooling air flowing in the base end 41*b* of the first cooling passage 50*a*, supplying the cooling air having a lower temperature from the middle part to the front end 41*a*, and increasing the flow velocity of the cooling air flowing in the front end of the first cooling passage 50*a*.

In the turbine blade according to the fourth embodiment, the interval P3 between the first cooling passages 50*a* adjacent to each other at the middle part in the axial direction Da is larger than each of the intervals P1 and P2 between the other first cooling passage 50*a* and second cooling passage 50*b* adjacent to each other. Due to this, the temperature of the middle part of the rotor blade 28B can be prevented from being lowered, and the strength of the rotor blade 28B can be improved.

The turbine blade according to the fourth embodiment includes the non-cooling part 56 not including the first cooling passage 50*a* at the middle part in the axial direction Da. Due to this, the cooling air does not flow to the non-cooling part 56, so that the temperature of the middle part of the rotor blade 28B can be prevented from being lowered. That is, a temperature difference between the middle part and each of the leading edge 41*e* and the trailing edge 41*f* can be reduced, and the cooling air flowing through the first cooling passage 50*a* can be prevented from being heated up. The strength of the rotor blade 28B can be improved by disposing the non-cooling part 56. As a result, thermal warpage of the rotor blade 28B can be prevented, and sufficient strength can be secured.

In the turbine blade according to the second to the fourth embodiments, as the first cooling passage 50*a*, disposed are the first cooling hole 53 including one end opening toward the front end 41*a* and having the inner diameter that is constant along the blade height direction Dh, and the second cooling hole 54 including one end communicating with the other end of the first cooling hole 53 and having the inner diameter that is increased toward the base end 41*b*. Due to this, the cooling air supplied to the base end passes through the second cooling hole 54 and the first cooling hole 53 to be discharged to the front end. In this case, the inner diameter of the second cooling hole 54 is increased toward the base end, so that the flow velocity of the cooling air flowing through the second cooling hole 54 is gradually increased before the cooling air flows into the first cooling hole 53. Due to this, a part from the middle position having a high heat load to the front end can be actively cooled by the cooling air.

In the turbine blade according to the second to the fourth embodiments, the length from one end of the first cooling hole 53 to the position where the first cooling hole 53 and the second cooling hole 54 are communicated with is 40% to 60% of the length from one end of the first cooling hole 53 to the gas path surface on the base end 41*b*. Due to this, the velocity of the cooling air flowing through the cooling passage 50 is reduced on the base end, and increased from the middle position to the front end. Accordingly, a part from the middle position having a high heat load to the front end can be actively cooled by the cooling air.

In the turbine blade according to the second to the fourth embodiments, the second cooling hole 54 has a tapered shape in which the inner diameter is continuously increased toward the base end 41*b*. Due to this, the second cooling hole 54 has the tapered shape without a level difference and the like, so that stress concentration can be prevented from being caused.

In the turbine blade according to the second to the fourth embodiments, the cooling passage 50 includes the base end-side cooling hole 51 including one end opening toward the base end 41*b*, and the cavity part 52 having the inner diameter larger than the inner diameter of the base end-side cooling hole 51 and communicating with the other end of the first cooling passage 50*a* or the other end of the second cooling passage 50*b* and with the other end of the base end-side cooling hole 51. Due to this, the cooling air supplied to the base end 41*b* is introduced into the cavity part 52 from the base end-side cooling hole 51, and introduced into the first cooling passage 50*a* and the second cooling passage 50*b* from the cavity part 52. Accordingly, the cooling air can be properly supplied to the blade parts 41, 41A, and 41B.

In the turbine blade according to the second to the fourth embodiments, the cavity part 52 is provided in the platform 42. Due to this, it is possible to easily form the cavity part 52 the inner diameter of which is larger than that of the first cooling passage 50*a*, the second cooling passage 50*b*, the second cooling hole 54, and the base end-side cooling hole 51.

The manufacturing method for a turbine blade according to the first embodiment includes the step of forming the first cooling hole 53 the inner diameter of which is constant along the blade height direction Dh from the front end toward the base end of the rotor blade 28 by electrolytic machining, and the step of forming the second cooling hole 54 the inner diameter of which is increased along the blade height direction by electrolytic machining while changing at least one of the current value and the machining speed from the first cooling hole 53.

Thus, by performing electrolytic machining while changing at least one of the current value and the machining speed from the first cooling hole 53, it is possible to easily form the second cooling hole 54 the inner diameter of which is increased along the blade height direction, and to efficiently manufacture the rotor blade 28 having high cooling performance.

The manufacturing method for a turbine blade according to the first embodiment includes the step of forming the base end-side cooling hole 51 the inner diameter of which is constant along the blade height direction Dh by electrolytic machining while keeping the current value and the machining speed constant from the base end, and the step of forming the cavity part 52 the inner diameter of which is larger than the inner diameter of the base end-side cooling hole 51 by electrolytic machining while reducing the machining speed to the minimum machining speed set in advance or stopping the machining at the end part of the base end-side cooling hole 51, and the second cooling hole 54 is caused to communicate with the cavity part 52.

Thus, the base end-side cooling hole 51 and the cavity part 52 are formed by electrolytic machining first, and the second cooling hole 54 is caused to communicate with the cavity part 52 thereafter. Accordingly, even if a machining error occurs at the time of electrolytic machining of the second cooling hole 54, the second cooling hole 54 is caused to communicate with the cavity part 52 having a large inner diameter, so that the cooling passage 50 can be properly formed.

In the manufacturing method for a turbine blade according to the first embodiment, after forming the basic second cooling hole the inner diameter of which is constant along the blade height direction Dh by electrolytic machining while keeping the current value and the machining speed constant at the step of forming the second cooling hole 54 by electrolytic machining, the second cooling hole 54 the inner diameter of which is increased along the blade height direction Dh is formed by electrolytic machining while changing at least one of the current value and the machining speed. Thus, the basic second cooling hole having the constant inner diameter is formed at the time of the first electrolytic machining, and the second cooling hole 54 the inner diameter of which is increased is formed at the time of the second electrolytic machining, so that, by using different electrodes at the time of the first electrolytic machining and at the time of the second electrolytic machining, the energization area of the electrode can be enlarged and electrolytic machining can be properly performed.

In the manufacturing method for a turbine blade according to the first embodiment, at the step of forming the second cooling hole 54 by electrolytic machining, the second cooling hole 54 the inner diameter of which is increased along the blade height direction Dh is formed by electrolytic machining while keeping the current value constant at a predetermined value or more (maximum value), and changing the machining speed. Thus, a predetermined electrolytic machining amount can be secured by keeping the current value constant at the predetermined value or more, and the second cooling hole 54 the inner diameter of which is increased can be properly formed by moving the electrode while changing the machining speed.

As the manufacturing method for a turbine blade according to the second to the fourth embodiments, the manufacturing method for each of the rotor blades 28, 28A, and 28B in which the cooling passages 50 along the blade height direction Dh are disposed at intervals in the axial direction Da includes the step of forming the first cooling passage 50a the inner diameter of which is increased by the first expansion ratio along the blade height direction Dh by electrolytic machining while adjusting at least one of the current value and the machining speed from the front end 41a toward the base end 41b of the rotor blade 28, 28A, or 28B, and the step of forming the second cooling passage 50b the inner diameter of which is constant or increased by the second expansion ratio smaller than the first expansion ratio along the blade height direction Dh by electrolytic machining while adjusting at least one of the current value and the machining speed from the front end 41a toward the base end 41b of the rotor blade 28, 28A, or 28B. Due to this, it is possible to easily form the first cooling passage 50a the inner diameter of which is increased along the blade height direction Dh and the second cooling passage 50b the inner diameter of which is constant or slightly increased along the blade height direction Dh, and to efficiently manufacture the rotor blade 28 having high cooling performance.

Regarding the manufacturing method for a turbine blade according to the second to the fourth embodiments, the first cooling passage 50a includes the first cooling hole 53 including one end opening toward the front end 41a and having the inner diameter that is constant along the blade height direction Dh, and the second cooling hole 54 including one end communicating with the other end of the first cooling hole 53 without a level difference and having the inner diameter that is increased toward the base end 41b. The length from one end on the front end 41a of the rotor blade 28, 28A, or 28B of the first cooling hole 53 to the position of the first cooling hole 53 and the second cooling hole 54 are communicated with is 40% to 60% of the length from one end of the first cooling hole 53 to the gas path surface on the base end 41b of the rotor blade 28, 28A, or 28B. Due to this, it is possible to form, with high accuracy, the first cooling passage 50a that can actively cool a part from the middle position having a high heat load to the front end by the cooling air.

In the manufacturing method for a turbine blade according to the second to the fourth embodiments, at the time of forming the second cooling hole 54 by electrolytic machining, the current value is constant at the predetermined value or more (for example, a maximum value), and the second cooling hole 54 the inner diameter of which is increased along the blade height direction is formed by electrolytic machining while changing the machining speed. Due to this, a predetermined electrolytic machining amount can be secured by keeping the current value constant at the predetermined value or more, and the second cooling hole 54 the inner diameter of which is increased can be properly formed by moving the electrode while changing the machining speed.

The gas turbine according to the second to the fourth embodiments includes the compressor 11, the combustor 12 that mixes the compressed air compressed by the compressor 11 with the fuel and combusts the mixture, and the turbine 13 that includes the rotor blade 28 as the turbine blade and obtains rotation power using a combustion gas FG generated by the combustor 12. Due to this, in the rotor blades 28, 28A, and 28B, a part from the middle position having a high heat load to the front end can be actively cooled by the cooling air. As a result, the rotor blade 28 can be efficiently cooled, so that cooling performance can be improved.

The position, the number, the size, and the like of the first cooling passage 50a and the second cooling passage 50b described above in the embodiments are not limited thereto, and may be appropriately set depending on the shape, the size, and an application environment of the rotor blades 28, 28A, and 28B.

In the embodiments described above, the turbine blade according to the present invention is applied to the rotor blade 28, but may be applied to the stator vane 27.

REFERENCE SIGNS LIST

10 GAS TURBINE
11 COMPRESSOR
12 COMBUSTOR
13 TURBINE
27 STATOR VANE
28 ROTOR BLADE (TURBINE BLADE)
32 ROTOR
41, 41A, 41B BLADE PART
41a FRONT END
41b BASE END
41c NEGATIVE PRESSURE SURFACE
41d POSITIVE PRESSURE SURFACE
41e LEADING EDGE
41f TRAILING EDGE
42 PLATFORM
42a, 42b SURFACE
43 BLADE ROOT PART
43a BASE END
50 COOLING PASSAGE
51 COOLING HOLE ON BASE END SIDE
52 CAVITY PART
53 FIRST COOLING HOLE
54 SECOND COOLING HOLE

55 THIRD COOLING HOLE
56 NON-COOLING PART
100 ELECTROLYTIC MACHINING DEVICE
101, 101A, 101B ELECTROLYTIC MACHINING TOOL
102 MOVING MECHANISM
103 GUIDING PART
110, 120, 130 TOOL MAIN BODY
111, 121, 131 ELECTRODE
112, 122, 132 INSULATING LAYER
123, 133 NON-INSULATION PART
Da AXIAL DIRECTION
Dc CIRCUMFERENTIAL DIRECTION
Dh BLADE HEIGHT DIRECTION
P1, P2, P3 INTERVAL

The invention claimed is:

1. A turbine blade comprising a plurality of cooling passages provided along a blade height direction that are disposed at intervals in a front and rear direction of the blade, wherein
the cooling passage includes:
a first cooling pass that includes
a first cooling hole that has a first end opening toward a front end of the turbine blade, and that has an inner diameter that is constant along the blade height direction, and
a second cooling hole that has a first end communicating with a second end of the first cooling hole, and that has an inner diameter that is increased by a first expansion ratio toward a base end of the turbine blade; and
a second cooling passage that includes a cooling hole having an inner diameter that is increased by a second expansion ratio from the front end toward the base end, the second expansion ratio being smaller than the first expansion ratio,
wherein a length from the one end of the first cooling hole to a position where the first cooling hole and the second cooling hole are communicated with is 40% to 60% of a length from the first end of the first cooling hole to a gas path surface on the base end.

2. The turbine blade according to claim 1, wherein
the turbine blade has a shape in which a width of a blade cross section is narrowed from a middle part in the front and rear direction toward a leading edge and a trailing edge, and
the second cooling passage is positioned in a closest side to the leading edge or the trailing edge.

3. The turbine blade according to claim 1, wherein the first expansion ratio is an expansion ratio of an inner diameter dimension, and ranges from 100% to 250%.

4. The turbine blade according to claim 1, wherein the first expansion ratio is a passage area expansion ratio based on an inner diameter dimension, and ranges from 100% to 306%.

5. The turbine blade according to claim 1, wherein an interval between the first cooling passages adjacent to each other at a middle part in the front and rear direction of the blade is larger than an interval between the other cooling passages adjacent to each other.

6. The turbine blade according to claim 1, further comprising a non-cooling part that does not include the cooling passage at a middle part in the front and rear direction.

7. The turbine blade according to claim 1, wherein the second cooling hole has a tapered shape in which the inner diameter is continuously increased toward the base end.

8. The turbine blade according to claim 1, wherein the cooling passage includes
a base end-side cooling hole that includes one end opening toward the base end; and
a cavity part that has an inner diameter larger than an inner diameter of the base end-side cooling hole, wherein the cavity part communicates with a second end of the base end-side cooling hole and with an end of the first cooling passage or an end of the second cooling passage.

9. The turbine blade according to claim 8, further comprising:
a blade part;
a platform; and
a blade root part, wherein
the cavity part is provided in the platform.

10. A gas turbine comprising:
a compressor configured to compress air;
a combustor configured to mix compressed air compressed by the compressor with fuel and combust a resulting mixture; and
a turbine configured to obtain rotation power using a combustion gas generated by the combustor, wherein
the turbine includes the turbine blade according to claim 1.

11. A manufacturing method for a turbine blade including a plurality of cooling passages along a blade height direction that are disposed at intervals in a front and rear direction of a blade, the manufacturing method comprising:
forming a first cooling passage by electrolytic machining while adjusting at least one of a current value and a machining speed from a front end toward a base end of the turbine blade, the first cooling passage having
a first cooling hole that has a first end opening toward the front end, and that has an inner diameter that is constant along the blade height direction, and
a second cooling hole that has a first end communicating with a second end of the first cooling hole without a level difference, and that has an inner diameter that is increased by a first expansion ratio toward the base end; and
forming a second cooling passage by electrolytic machining while adjusting at least one of a current value and a machining speed from the front end toward the base end of the turbine blade, the second cooling passage having an inner diameter that is increased by a second expansion ratio along the blade height direction, the second expansion ratio being smaller than the first expansion ratio, wherein
a length from the first end of the first cooling hole on the front end of the turbine blade to a position where the first cooling hole and the second cooling hole are communicated with is 40% to 60% of a length from the first end of the first cooling hole to a gas path surface on the base end of the turbine blade.

12. The manufacturing method for a turbine blade according to claim 11, further comprising forming the second cooling hole by electrolytic machining while keeping a current value constant at a predetermined value or more and changing a machining speed, the second cooling hole having the inner diameter that is increased along the blade height direction.

* * * * *